United States Patent
Henriksson et al.

(10) Patent No.: US 12,411,262 B2
(45) Date of Patent: *Sep. 9, 2025

(54) AEROLOGICAL SONDE AND METHOD FOR MEASURING METEOROLOGICAL CONDITIONS

(71) Applicant: Skyfora Oy, Helsinki (FI)

(72) Inventors: Svante Henriksson, Helsinki (FI); Antti Pasila, Helsinki (FI); Kim Kaisti, Helsinki (FI)

(73) Assignee: Skyfora Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/777,635

(22) PCT Filed: Nov. 19, 2020

(86) PCT No.: PCT/FI2020/050777
§ 371 (c)(1),
(2) Date: May 18, 2022

(87) PCT Pub. No.: WO2021/099688
PCT Pub. Date: May 27, 2021

(65) Prior Publication Data
US 2022/0404523 A1   Dec. 22, 2022

(30) Foreign Application Priority Data

Nov. 20, 2019 (FI) ........................................ 20195996

(51) Int. Cl.
*G01W 1/08* (2006.01)
*G01C 19/5712* (2012.01)
(Continued)

(52) U.S. Cl.
CPC ............ *G01W 1/08* (2013.01); *G01C 19/5712* (2013.01); *G01P 1/00* (2013.01); *G01P 15/18* (2013.01);
(Continued)

(58) Field of Classification Search
CPC ...... G01W 1/08; G01W 1/02; G01C 19/5712; G01P 15/18; G01P 1/00; G01S 19/01
See application file for complete search history.

(56) References Cited

U.S. PATENT DOCUMENTS 3,841,154 A * 10/1974 Mallery ................. G01W 1/08
340/870.1
6,655,206 B1 * 12/2003 Barat ...................... G01W 1/08
73/170.01
(Continued)

FOREIGN PATENT DOCUMENTS

CN     103472503 A      12/2013
CN     203720382    *   7/2014
(Continued)

OTHER PUBLICATIONS

Translation of CN203720382.*
(Continued)

*Primary Examiner* — Helen C Kwok
(74) *Attorney, Agent, or Firm* — CARTER, DELUCA & FARRELL LLP

(57) ABSTRACT

An aerological sonde for measuring meteorological conditions in a cyclonic storm, the aerological sonde including a sonde casing having an outer casing surface and measurement unit arranged inside the sonde casing. The outer casing surface is arranged to form a sole drag surface of the aerological sonde such that a self-sustaining aerological sonde is formed. The measurement unit of the self-sustaining aerological sonde includes a turbulence sensor arranged (Continued)

to measure change of movement of the self-sustaining aerological sonde.

19 Claims, 19 Drawing Sheets

(51) Int. Cl.
    *G01P 1/00*      (2006.01)
    *G01P 15/18*      (2013.01)
    *G01S 19/01*      (2010.01)
    *G01W 1/02*      (2006.01)
    *H04Q 9/00*      (2006.01)

(52) U.S. Cl.
    CPC ............... *G01S 19/01* (2013.01); *G01W 1/02* (2013.01); *H04Q 9/00* (2013.01); *H04Q 2209/84* (2013.01)

(56) References Cited

U.S. PATENT DOCUMENTS

| | | | |
|---|---|---|---|
| 10,336,432 B1* | 7/2019 | Farley | B64B 1/62 |
| 2005/0014499 A1 | 1/2005 | Knoblach et al. | |
| 2007/0073486 A1 | 3/2007 | Tillotson et al. | |
| 2008/0177474 A1 | 7/2008 | Clayson et al. | |
| 2014/0043172 A1* | 2/2014 | Manobianco | G01W 1/08 |
| | | | 340/870.07 |
| 2014/0224009 A1* | 8/2014 | Brown | G01P 13/045 |
| | | | 73/170.28 |
| 2017/0059745 A1* | 3/2017 | Kim | G01W 1/08 |
| 2019/0094051 A1* | 3/2019 | Hoffmann | H04Q 9/02 |
| 2019/0154874 A1* | 5/2019 | Shams | B64C 1/0009 |
| 2023/0033142 A1* | 2/2023 | Henriksson | G01W 1/08 |

FOREIGN PATENT DOCUMENTS

| | | |
|---|---|---|
| CN | 205193300 U | 4/2016 |
| CN | 208110079 U | 11/2018 |
| CN | 109828321 A | 5/2019 |

OTHER PUBLICATIONS

Bertoldo, S. et al. Disposable falling sensors to monitor atmospheric parameters. In: Remote Sensing of Clouds and the Atmosphere XXI, 2016, Edinburgh, United Kingdom, SPIE—The International Society of Optics and Photonics, Oct. 19, 2016, vol. 10001, 1000104-1000104-9, ISSN 0277-786X, <DOI:10.1117/12.2241156> the entire document, especially abstract; sections 3.1 "Raindrop falling speed"; 4.1 "Basic realization principles"; 4.2 "Outer shell realization principle"; 4.3 "Sensors"; 4.4 "Transmission system"; 4.5 "Power supply system and energy balance"; 5.

"Twister", a 1996 film by I. Bryce, M. Crichton and K. Kennedy. The film script by M. Crichton and A-M. Martin. Script available on URL <http://daydream.mentadd.com/movies/scripts/twister.htm> See annotated script: p. 7 line 24-p. 8 line 18; p. 11 lines 8-11; p. 38 lines 28-29; p. 45 lines 12-18. See also scene from the beginning of film in which the character Dr. Harding is introduced to the "Dorothy" instrument pack located on a pick-up truck.

International Search Report issued by the Finnish Patent and Registration Office acting as the International Searching Authority in relation to International Application No. PCT/FI2020/050777 dated Jan. 21, 2021 (5 pages).

Written Opinion of the International Searching Authority issued by the Finnish Patent and Registration Office acting as the International Searching Authority in relation to International Application No. PCT/FI2020/050777 dated Jan. 21, 2021 (9 pages).

Finnish Search Report issued by the Finnish Patent and Registration Office in relation to Finnish Application No. 20195996 dated May 11, 2020 (2 pages).

* cited by examiner

AEROLOGICAL SONDE AND METHOD FOR MEASURING METEOROLOGICAL CONDITIONS

CROSS-REFERENCE TO RELATED APPLICATIONS

This application is a national phase entry under 35 U.S.C. 371 of PCT International Application No. PCT/2020/050777 filed Nov. 19, 2020, which claims priority to Finnish Patent Application No. 20195996, filed Nov. 20, 2019, the disclosure of each of these applications is expressly incorporated herein by reference in their entirety.

FIELD OF THE INVENTION

The present invention relates to an aerological sonde. The present invention further relates to a method for measuring meteorological conditions of a cyclonic storm.

BACKGROUND OF THE INVENTION

Meteorological conditions off ground in the atmosphere are conventionally measured with aerological sondes. The aerological sondes usually contain a GPS receiver, along with pressure, temperature, and humidity sensors to capture atmospheric profiles. The sondes typically transmit this data to a computer by radio transmission. This helps meteorologists to find out information at elevated heights, including in tropical cyclones and tornadoes. The data obtained is usually fed into computers for numerical weather prediction, enabling more accurate weather predictions.

There are basically two types of aerological sondes that work without being onboard powered vehicles, such as airplanes or drones. A dropsonde comprises a sonde device 2 and a parachute 6 attached to the sonde device 2 with an attachment member 7, as shown in FIG. 2. The dropsonde is dropped from an aircraft to measure storm conditions as the sonde device falls to the surface. The dropsonde descent is slowed and stabilized by the parachute, allowing for more readings to be taken before it reaches the ocean surface or ground surface. The parachute is designed to immediately deploy after release of the dropsonde for reducing or eliminating any pendulum movements. The dropsonde typically drops for three to fifteen minutes before reaching the ocean or ground surface. The dropsonde has a sonde casing to protect electronics and form a more stable aerodynamic profile. The parachute is attached to the sonde casing.

The other type of aerological sonde without a powered carrying airborn vehicle is a floating sonde comprising a sonde device 2 and a balloon 4 attached to the sonde device 2 with an attachment member 5, as shown in FIG. 1. The balloon is filled with gas lighter than air such that the flowing sonde raises upwards when released from the sea or ground surface. The balloon controls the ascent and stabilizes it. Some floating sondes are anchored to ground in such a way that they remain at a certain height. The floating sonde has a sonde casing to protect electronics and form a more stable aerodynamic profile. The balloon is attached to the sonde casing.

The prior art aerological sondes provide information of meteorological conditions in their typical descending or ascending trajectory and data of intensity of and strength of the cyclonic storm is based on location information received from the GPS system. Accordingly, the intensity and strength data is based on location and rate of change of the location of the aerological sonde as it travels through the cyclonic storm. The information received via the GPS system provides movement speed and direction of the cyclonic storm. Therefore, the prior art aerological sondes have limited capability to provide data and information concerning the intensity and strength of the cyclonic storm and data and information of wind speed, intensity, and strength in the cyclonic storm.

BRIEF DESCRIPTION OF THE INVENTION

An object of the present invention is to provide an aerological sonde and method for measuring meteorological conditions so as to solve or at least alleviate the prior art disadvantages.

The preferred embodiments of the invention are disclosed in the dependent claims.

The invention is based on the idea of providing an aerological sonde for measuring meteorological conditions in the atmosphere off-ground, for example in a cyclonic storm or a tornado. The aerological sonde comprises a sonde casing having an outer casing surface and a measurement unit arranged inside the sonde casing. The measurement unit of the aerological sonde comprises a turbulence sensor arranged to measure turbulence in the cyclonic storm. The outer casing surface of the sonde casing is arranged to form drag surface of the aerological sonde such that a self-sustaining aerological sonde is formed. The turbulence sensor is arranged to measure movement of the self-sustaining aerological sonde for measuring turbulence of the atmosphere.

The turbulence sensor is arranged to measure rotation of the aerological sonde in the atmosphere, for example within the cyclonic storm. Further, the turbulence sensor is arranged to measure turbulence or spatial turbulence by measuring movement or change of movement of the aerological sonde induced by the winds or air flows.

While vorticity and local rotation are of top interests in turbulent flows, they may also occur in laminar flows. Hence, we call the sensor a turbulence sensor, even if it can measure vorticity also in laminar flows.

In one embodiment, the outer casing surface of the sonde casing is arranged to form a sole drag surface of the aerological sonde such that a self-sustaining aerological sonde is formed. Accordingly, the aerological sonde does not comprise any external additional lift members, such as a balloon, increasing lift force of the aerological sonde or any external additional drag member increasing drag force of the aerological sonde, such as parachute. Thus, the aerological sonde of the present invention travels freely in atmospheric flows. This means, that winds may move and affect movements of the self-sustaining aerological sonde freely without stabilizing forces affecting the aerological sonde.

It should be noted that some components of the measurement unit may be provided on or extend outwards from the outer casing surface of the sonde casing. These components may comprise for example antenna or measurement head or tip of a sensor of the measurement unit. These measurement unit components extending or provided on the outer casing surface are minor components and have minor effect of the overall drag surface. Accordingly, in the context of this application the definition that the outer casing surface of the sonde casing is arranged to form drag surface of the aerological sonde means that some minor measurement unit components may extend of the outer casing surface. Thus, the drag surface is formed by the outer casing surface and one or more possible measurement unit components or parts thereof.

In an embodiment, in which the outer casing surface forms the sole drag surface of the self-sustaining aerological sonde, there are no measurement unit components on the outer casing surface.

In one embodiment, the turbulence sensor comprises a gyroscopic sensor arranged to measure orientation of the self-sustaining aerological sonde. The gyroscopic sensor is arranged to measure changes in orientation of the aerological sonde or angular velocity of the aerological sonde in relation to at least one rotation axis of the aerological sonde. Thus, the gyroscopic sensor may measure spinning or turning of the aerological sonde in atmospheric flows, for example due to the turbulent streams or turbulent flows in the cyclonic storm. The measurements of the gyroscopic sensor can provide information for example of vorticity and internal turbulence in a cyclonic storm, which in turn can be applied to obtain information that is useful for predicting the track and intensity of the cyclonic storm.

In one embodiment, the gyroscopic sensor is a multi-dimensional gyroscopic sensor. In this embodiment, the gyroscopic sensor is constructed and arranged to measure orientation or angular velocity of the aerological sonde in relation to two or more rotation axes. Preferably, the two or more rotation axes extend perpendicularly to each other. The multi-dimensional gyroscopic sensor provides detailed measurement data of turbulence and spinning of the aerological sonde around two or more rotation axes. The multi-dimensional gyroscopic sensor has a good effective weight as the one component is able to measure turbulence and spinning of the aerological sonde around two or more rotation axes.

In another embodiment, the gyroscopic sensor is a 3-dimensional gyroscopic sensor. In this embodiment, the gyroscopic sensor is constructed and arranged to measure orientation or angular velocity of the aerological sonde in relation to three rotation axes. Preferably, the three rotation axes extend perpendicularly to each other. 3D gyroscopic sensors are efficient in providing detailed measurement data of turbulence and spinning of the aerological sonde in three-dimensional space around three rotation axes and measuring turbulence. The three-dimensional gyroscopic sensor has a good effective weight as the one component is able to measure turbulence and rotation of the aerological sonde around three rotation axes.

In a further embodiment, the gyroscopic sensor comprises one or more one-dimensional gyroscopic sensors. In this embodiment, the turbulence sensor comprises one or more separate one-dimensional gyroscopic sensors, each of which is constructed and arranged to measure orientation or angular velocity of the aerological sonde in relation to one rotation axis. The direction of each of the rotation axes of separate one-dimensional gyroscopic sensors may be chosen freely. Further, the number of separate gyroscopic sensors may be chosen freely.

In one embodiment, the gyroscopic sensor is a vibrating structure gyroscopic sensor. The vibrating structure gyroscopic sensor uses a vibrating structure to determine the rate of rotation. Vibrating structure gyroscopes are simpler in construction and good accuracy.

In another embodiment, the gyroscopic sensor is a microelectromechanical gyroscopic sensor, MEMS gyroscopic sensor. The MEMS gyroscopic sensor is light-weight and accurate, and thus suitable for the aerological sonde. The MEMS gyroscopic sensor is one type of vibrating structure gyroscopic sensor.

In one embodiment, the turbulence sensor comprises an accelerometer arranged to measure change of rate of velocity of the self-sustaining aerological sonde. The accelerometer measures changes in moving velocity of the aerological sonde. Thus, the accelerometer provides information of the turbulence and turbulent flows as the turbulence causes changes in movement velocity of the aerological sonde.

In one embodiment, the accelerometer is a multi-dimensional accelerometer. In this embodiment, the accelerometer is constructed and arranged to measure acceleration of the aerological sonde in direction of two or more velocity axes. Preferably, the two or more velocity axes extend perpendicularly to each other. The multi-dimensional accelerometer provides detailed measurement data of turbulence and changes in movement velocity of the aerological sonde in direction of two or more velocity axes. The multi-dimensional accelerometer has a good effective weight as the one component is able to measure turbulence and acceleration of the aerological sonde in direction of two or more acceleration axes.

In another embodiment, the accelerometer is a 3-dimensional accelerometer. In this embodiment, the accelerometer is constructed and arranged to measure changes in movement velocity of the aerological sonde in relation to three velocity axes. Preferably, the three velocity axes extend perpendicularly to each other. 3D accelerometers are efficient in providing detailed measurement data of turbulence and acceleration of the aerological sonde in three dimensional space around in direction of three velocity axes and measuring turbulence. The three-dimensional accelerometer has a good effective weight as the one component is able to measure turbulence and change of movement velocity of the aerological sonde in direction of three rotation axes.

In a further embodiment, the accelerometer comprises one or more one-dimensional accelerometers. In this embodiment, the accelerometer comprises one or more separate one-dimensional accelerometers, each of which is constructed and arranged to measure change of velocity of the aerological sonde in direction of one velocity axis. The direction of each of the velocity axes of separate one-dimensional accelerometers may be chosen freely. Further, the number of separate accelerometers may be chosen freely.

In one embodiment, the accelerometer is a microelectromechanical accelerometer, MEMS accelerometer. The MEMS accelerometer is light weight and accurate, and thus suitable in the aerological sonde.

In one embodiment, the gyroscopic sensor and the accelerometer are provided as a single component. This provides light weight and efficient utilization of space in the aerological sonde.

In another embodiment, the gyroscopic sensor and the accelerometer are provided as separate components. This enables placing the components more freely to the aerological sonde and thus adjusting the g centre of gravity of the aerological sonde in efficient and accurate manner to desired location.

It should be noted, that in some embodiments, the aerological sonde and the turbulence sensor thereof comprises only one of the gyroscopic sensor and the accelerometer.

In one embodiment, the turbulence sensor, or the accelerometer and/or gyroscopic sensor thereof, is secured to the sonde casing. This provides a light-weight solution as no additional attachment parts are needed.

The turbulence sensor, or the accelerometer and/or gyroscopic sensor thereof, are in some embodiments secured to an inner surface of the sonde casing.

The turbulence sensor, or the accelerometer and/or gyroscopic sensor thereof, is provided to a circuit board and the circuit board is secured or attached to the to the sonde casing or to the inner surface of the sonde casing for securing the turbulence sensor to the sonde casing.

In another embodiment, the turbulence sensor is arranged to a measurement unit support, the measurement unit support is secured to the sonde casing. This enables locating the measurement unit and the turbulence sensor, or the accelerometer and/or gyroscopic sensor thereof, in desired locations in the aerological sonde and inside the sonde casing. Thus, the centre of gravity of the aerological sonde may be provided to a desired location.

The turbulence sensor, and the accelerometer and/or gyroscopic sensor thereof, measure accurately the spinning and acceleration of the whole aerological sonde and the sonde casing as they are secured to the sonde casing such that they cannot move relative to the sonde casing. Thus, the forces subjected to the aerological sonde and the sonde casing may be calculated from the measured data.

In one embodiment, the measurement unit comprises a global navigation satellite system element arranged to provide location information of the self-sustaining aerological sonde. The global navigation satellite system element provides additional movement information of the aerological sonde in the cyclonic storm. The location information and movement information of the aerological sonde provided by the global navigation satellite system element enable further detailed calculations of the turbulence.

In one embodiment, the measurement unit comprises one or more of the following: a pressure sensor, a humidity sensor, a gas sensor, and a temperature sensor. These weather sensors provide meteorological measurement data which may be combined with measured turbulence sensor data to estimate meteorological conditions more accurately. This information in turn may be applied in predicting future meteorological conditions, including turbulence, more accurately.

In one embodiment the gas sensor is an ozone-sensor or nitrogen oxide-sensor or the like. In some embodiments the aerological sonde may comprise one or more different gas sensors.

In one embodiment, the sonde casing comprises a first symmetry plane and a second symmetry plane. The first symmetry plane and the second symmetry plane extend perpendicularly to each other. Accordingly, the shape of the sonde casing and thus the outer shape of the aerological sonde is symmetric in two directions relative to the first and second symmetry planes. Accordingly, the shape of the sonde casing may be for example elliptical or cylindrical. The symmetry in relation two planes and defined shape provides basis for turbulence calculations from the measurement data of the turbulence sensor.

In another embodiment, the sonde casing comprises a first symmetry plane, a second symmetry plane and a third symmetry plane. The first symmetry plane, the second symmetry plane and the third symmetry plane extend perpendicularly to each other. Accordingly, the shape of the sonde casing and thus the outer shape of the aerological sonde is symmetric in three directions relative to the first, second and third symmetry planes. The shape of the sonde casing may be for example spherical or cubical. The symmetry in relation three planes and defined shape provides an accurate basis for turbulence calculations from the measurement data of the turbulence sensor and accurate analysis of the spinning and movement of the aerological sonde. Further, in this embodiment the shape of the aerological sonde has a small effect on the measured turbulence values.

In one embodiment, the self-sustaining aerological sonde comprises a centre of gravity. The centre of gravity is arranged to at least one of the symmetry planes. This enables accurate turbulence measurements and the shape and weight balance of the aerological sonde has little effect on the spinning and movement of the aerological sonde.

Preferably the centre of gravity is arranged to an intersection of at least two symmetry planes. This provides a behaviour of the aerological sonde that is predictable in turbulent flows.

The self-sustaining sonde is arranged to migrate in the atmosphere without any additional lift or drag member. The self-sustaining aerological sonde of the present invention has a terminal velocity which enables the self-sustaining aerological sonde stay in the atmosphere a prolonged time. The terminal velocity is determined by the outer casing surface of the self-sustaining aerological sonde and weight of the self-sustaining aerological sonde. The self-sustaining aerological sonde of the present invention has the terminal velocity equal to or less than 7 m/s.

In a preferred embodiment, the self-sustaining aerological sonde of the present invention has the terminal velocity equal to or less than 5 m/s.

In a more preferable embodiment, the self-sustaining aerological sonde of the present invention has the terminal velocity equal to or less than 4 m/s.

The smaller the terminal velocity is, the longer the self-sustaining aerological sonde may migrate in the atmosphere.

The present invention is also based on an idea of providing a method for measuring meteorological conditions with an aerological sonde in the atmosphere, for example in a cyclonic storm or a tornado. The aerological sonde comprises a sonde casing having an outer casing surface and measurement unit arranged inside the sonde casing. In the method, the aerological sonde is released into the atmosphere to measure meteorological conditions.

According to the present invention, the aerological sonde comprises the outer casing surface arranged to form drag surface of the aerological sonde such that the self-sustaining aerological sonde is formed. The method comprises migrating the aerological sonde in the atmosphere by utilizing the drag surface of the self-sustaining aerological sonde, and measuring movement of the self-sustaining aerological sonde with the turbulence sensor provided to the aerological sonde during migration of the self-sustaining aerological sonde in the atmosphere for measuring turbulence of the atmosphere.

In a preferred embodiment, the method is carried out by measuring meteorological conditions in a cyclonic storm or a tornado.

The method provides measuring movement and/or change of movement of the aerological sonde in atmospheric flows, for example within a cyclonic storm. Accordingly, in the method turbulence is measured by measuring movement or change of movement of the aerological sonde induced by the winds and air flows.

In one embodiment, the aerological sonde comprises an outer casing surface arranged to form a sole drag surface of the aerological sonde such that a self-sustaining aerological sonde is formed. The method then comprises migrating the self-sustaining aerological sonde in the atmosphere by utilizing the sole drag surface of the self-sustaining aerological sonde, and measuring turbulence of the atmosphere with the turbulence sensor provided to the self-sustaining aerological sonde during the migration of the self-sustaining aerological sonde in the atmosphere.

Therefore, the aerological sonde of the present invention travels freely in atmospheric flows. This means that the winds and flows may move and affect movements of the self-sustaining aerological sonde enabling the turbulence to affect the movements of the aerological sonde. Thus, the turbulence of the atmosphere may be measured accurately by measuring the movements of the self-sustaining aerological sonde.

In one embodiment, the measuring the turbulence of the with the turbulence sensor comprises measuring change of orientation of the self-sustaining aerological sonde in the atmosphere with a gyroscopic sensor. Thus, the turbulence is measured by measuring spinning or angular velocity of the aerological sonde induced by atmospheric flows on the aerological sonde.

In another embodiment, measuring the turbulence with the turbulence sensor comprises measuring change of orientation of the self-sustaining aerological sonde in the atmosphere with a gyroscopic sensor around one or more rotation axes. Measuring the angular velocity of the aerological sonde in relation to several rotation axes provides accurate and additional information of the turbulence in the spatial and temporal dimensions.

In one embodiment, measuring the turbulence with the turbulence sensor comprises measuring rate of change of velocity of the self-sustaining aerological sonde in the atmosphere with an accelerometer. The accelerometer provides measurement data of changes in velocity, or translational velocity, of the aerological sonde during migration in the atmosphere.

In another embodiment, the measuring of the turbulence of the atmosphere with the turbulence sensor comprises measuring change of rate of velocity of the self-sustaining aerological sonde in the atmosphere with an accelerometer in a direction of one or more velocity axes. Measuring the acceleration of the aerological sonde in relation to several velocity axes provides accurate and additional information of the turbulence in the atmosphere in the spatial and temporal dimensions.

In one embodiment, the method further comprises measuring the location of the self-sustaining aerological sonde with a global navigation satellite system during migration of the self-sustaining aerological sonde in the atmosphere. The location information and movement information of the aerological sonde provided by the global navigation satellite system element enable further detailed calculations of the turbulence.

In some embodiments, the method may further comprise measuring meteorological conditions in the atmosphere with a meteorological measurement element.

In one embodiment, the method comprises measuring at least one of the following: atmospheric pressure, humidity, temperature, gases in the atmosphere and magnetism.

Preferably the method is carried out with an aerological sonde as described above.

The flow field of a cyclonic storm, closely related to its intensity and its short-term development, is based on the wind speed and velocity in the atmosphere or in the whole cyclonic storm as well as turbulence of the wind within the atmosphere or in the cyclonic storm. The present invention provides an aerological sonde and method for measuring the turbulence of flows within the atmosphere by measuring the movement and change of movement of the aerological sonde with a turbulence sensor. Providing the aerological sonde as a self-sustaining aerological sonde with the outer surface of the sonde casing forming the drag surface, or the sole drag surface, of the aerological sonde enables accurate turbulence measurements as the movement of the aerological sonde is free in the atmosphere.

BRIEF DESCRIPTION OF THE DRAWINGS

The invention is described in detail by means of specific embodiments with reference to the enclosed drawings, in which.

DETAILED DESCRIPTION OF THE INVENTION

Figure 1:
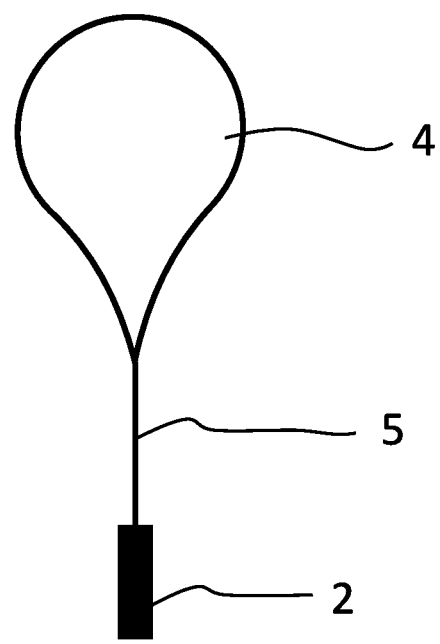
FIGS. 1 and 2 shows schematically prior art aerological sondes without carrying airborne vehicles.
Figure 2:
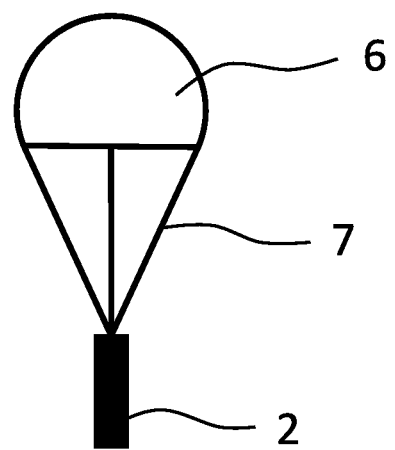

In the context of this application, the aerological sonde 10, and all the parts and components thereof, means an aerological sonde which is arranged to be floated or migrated in the atmosphere and atmospheric flows, for example in a cyclonic storm.

In the context of this application, a cyclonic storm means a rapidly rotating storm system comprising a low-pressure center, a closed low-level atmospheric circulation, strong winds, and a spiral arrangement of thunderstorms. Depending on its location and strength, the cyclonic storm is referred to by different names, including hurricane, typhoon, tropical storm, tropical depression, and simply cyclone. Further a tornado is a rapidly rotating column of air that is in contact with both the surface of the Earth and a cumulonimbus cloud. A tornado is often referred to as a twister, whirlwind or cyclone.

In the context of this application, the aerological sonde according to the present invention comprises sonde casing and a measurement unit inside the sonde casing. The measurement unit comprises components for carrying out measurements relating to meteorological conditions of the cyclonic storm. The sonde casing comprises casing walls having an outer surface and this outer surface of the sonde casing also forms the outer surface of the aerological sonde. Therefore, the outer surface of the sonde casing alone defines outer shape of the aerological sonde. This means, that there are no additional components provided outside the sonde casing or the casing walls. Thus, the sonde casing and the outer surface of the sonde casing is arranged to define drag surface of the whole aerological sonde. Thus, a self-sustaining aerological sonde may be provided.

Different embodiments of a self-sustaining aerological sonde 10 according to the present invention is shown in FIGS. 3 to 27.

In some embodiments, the outer casing surface forms the sole outer surface of the aerological sonde. Accordingly, the outer casing surface forms the only, and thus sole, drag surface of the aerological sonde as it migrates in the atmosphere. Accordingly, in this embodiment there are no other components or elements provided on or extending outwards from the outer casing surface.

In some other embodiments, one or more components of the measurement unit may be provided on or extend outwards from the outer casing surface of the sonde casing. These components may comprise for example antenna or measurement head or tip of a sensor of the measurement unit. These measurement unit components extending or provided on the outer casing surface are minor components and have minor effect of the overall drag surface.

Accordingly, in the context of this application, the drag surface is formed by the outer casing surface and one or more possible measurement unit components or parts thereof.

In an embodiment, in which the outer casing surface forms the sole drag surface of the self-sustaining aerological sonde, there are no measurement unit components on the outer casing surface.

Terminal velocity is a maximum velocity attainable by an object as it falls through a fluid or a gas, for example air. It occurs when the sum of the drag force subjected to the object and the buoyancy subjected to the object is equal to the downward force of gravity acting on the object. Since the net force on the object is zero, the object has zero acceleration. Thus, the object is moving at its terminal velocity if its speed is constant due to the restraining force exerted by the gas through which it is moving. As the speed of the object increases, so does the drag force acting on it. At some speed, the drag force will equal to the gravitational pull on the object. At this point the object ceases to accelerate and continues falling at a constant speed called the terminal velocity. The drag force depends on the projected area or cross-sectional area or silhouette area of the object in a horizontal plane.

Drag force is calculated from an equation:

$$F_D = \tfrac{1}{2}\rho v^2 C_D A$$

where
$F_D$=drag force,
$\rho$=density of the fluid (air 1,225),
v=speed of object relative to the fluid,
$C_D$=drag coefficient of the object, and
A=cross-sectional area of the object.

Figures 17, 18:
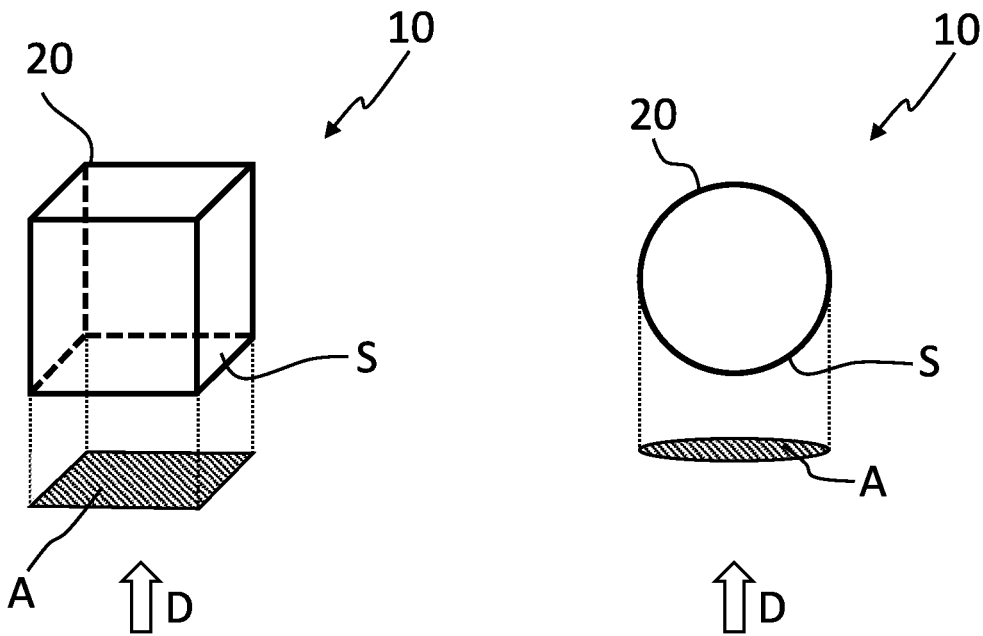
FIGS. 17, 18, 19 and 20 show schematically effective surface areas of different shapes of the aerological sonde according to the present invention in relation to drag coefficient.
Figures 19, 20:
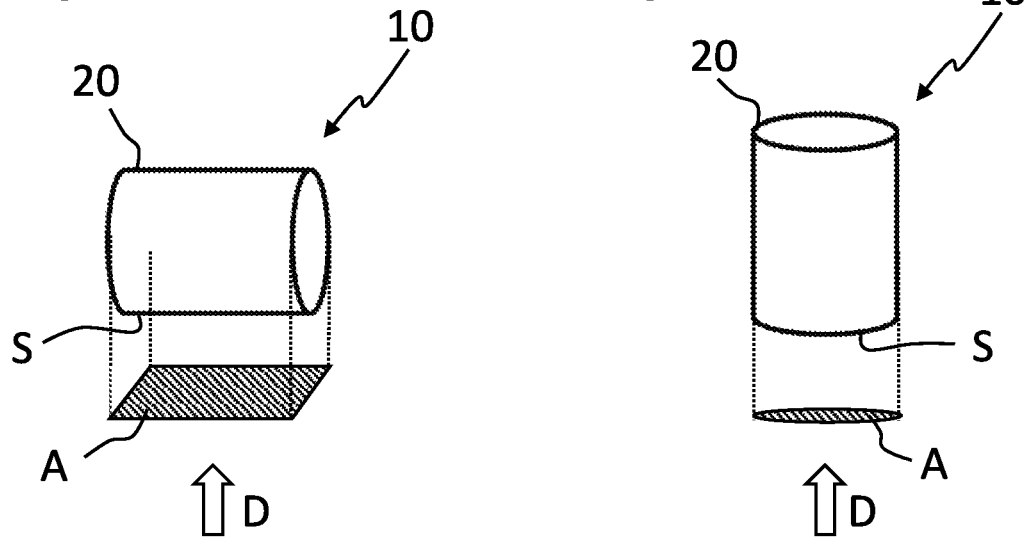

FIGS. 17, 18, 19 and 20 show aerological sondes 10 with different shapes. The shape of the aerological sondes 10 is defined by the outer surface S of the sonde casing 20. Therefore, sonde casing 20 and the outer surface S thereof defines the shape of the aerological sonde 10 and also the projected area or cross sectional area A of the aerological sonde 10. The projected area A of the aerological sonde 10 depends on the projection direction D, as shown in FIGS. 19 and 20. In FIGS. 19 and 20 two different projected areas A are shown for an aerological sonde 10 having cylindrical shape as viewed in direction D. Further, the projected area of an aerological sonde 10 having spherical shape, shown in FIG. 18, is same in all directions D as the cross-sectional area is the same in all viewing directions D and the sphere is symmetrical in relation to its centre point. The sphere is also symmetrical in relation to three symmetry planes extending perpendicularly to each other. The aerological sonde 10 having cubic shape, as shown in FIG. 17, is also symmetrical in relation to three symmetry planes extending perpendicularly to each other. However, the cross-sectional area A of the cubic shape varies depending on the viewing direction D.

The shape of the aerological object further has an effect on the drag coefficient. The drag coefficient if specific for a certain shape. Thus, every shape has a different drag coefficient, that is further dependent on the Reynolds number. The smaller the drag coefficient the smaller the drag force.

In the context of this application, the aerological sonde and the sonde casing thereof is provided with a shape having good drag properties. Thus, the shape of the aerological sonde and the sonde casing is provided such that a relatively high drag coefficient is achieved. In the present invention of the drag coefficient of the aerological sonde and the sonde casing is equal to or greater than 0.4, with Reynolds number $10^4$. The Reynolds number changes due to velocity in respect to the object in the fluid, such as the aerological sonde in air. The concept of Reynold number is generally known.

The drag coefficient for example a sphere is 0.47, for a cube 0.8-1.05 (depending on alignment), for a cone about 0.5 (depending on alignment) and for a short cylinder about 1.15 (depending on alignment), with Reynolds number $10^4$. It should be noted, that the drag coefficient for a streamlined shape may be 0.05 or less, with Reynolds number $10^4$.

Accordingly, in the present invention the shape of the aerological sonde defined by the outer surface of the sonde casing is greater than 0.4, with Reynolds number $10^4$. To achieve this, the shape of the sonde casing is spherical, elliptical, cubical, conical, cylindrical, polyhedral or the like having drag coefficient equal to or greater than 0.4. The sonde casing may also have cubical, conical, cylindrical or polyhedral shape with rounded corners.

Symmetrical shapes are preferable for calculating turbulence values of the cyclonic storm based on the behaviour and movement and angular velocities and changing translation and velocities and angular velocities. Compared to asymmetric shapes, movement behaviour of symmetrical shapes is easier to model and estimate, and their behaviour in turbulent flows may be calculated more easily. However, the present invention is not restricted to any specific shape, symmetrical shape or non-symmetrical shape.

According to the above mentioned, in preferred embodiments the sonde casing 20 of the self-sustaining aerological sonde comprises a first symmetry plane B and a second symmetry plane C. The first symmetry plane B and the second symmetry plane C extend perpendicularly to each other. Thus, the sonde casing may have a cubical, cylindrical, polyhedral, spherical or elliptical shape with the first and second symmetry planes B, C.

Figure 11:
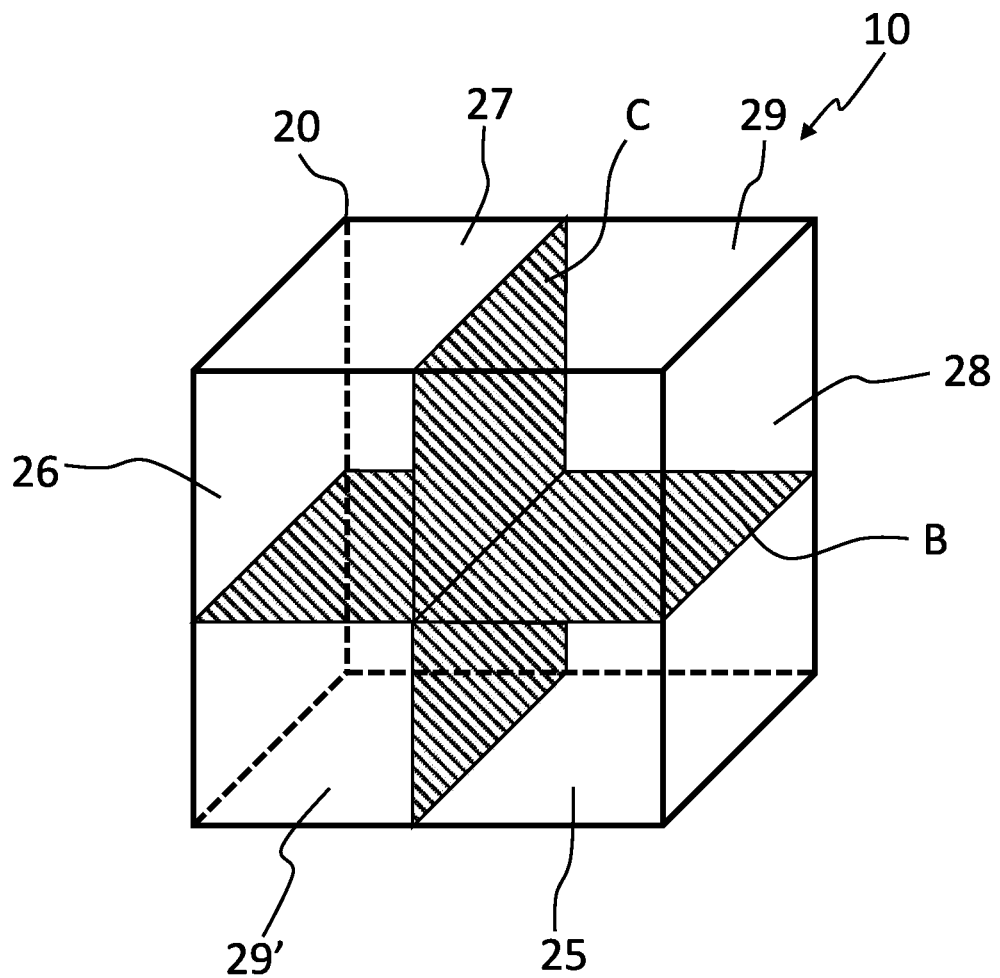

FIG. 11 shows an embodiment in which the sonde casing 20 comprises a shape with the first and second symmetry planes C, D. The first symmetry plane B extends between a first side wall 26 and a second wall 28 of the sonde casing 20 and between a third side wall 29 and a fourth side wall 29', and in horizontal direction in FIG. 11. Further, the second symmetry plane C extends between a top wall 27 and a bottom wall 25 of the sonde casing 20 and between the third side wall 29 and the fourth side wall 29' and in vertical direction in FIG. 11.

In the cubical shape of the sonde casing 20 of the embodiment of FIG. 11 further comprises a third symmetry plane (not shown) extending between the first side wall 26 and a second wall 28 of the sonde casing 20 and between the top wall 27 and the bottom wall 25 of the sonde casing 20 and in vertical direction in FIG. 11. The third symmetry plane extends perpendicularly to the first and second symmetry planes B, C.

Figure 16:
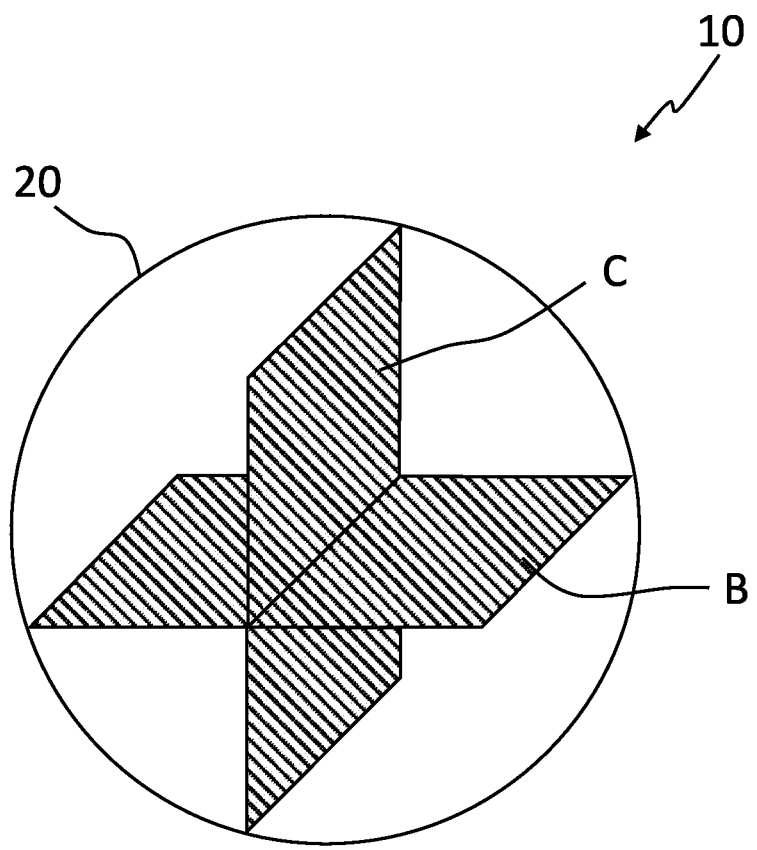

FIG. 16 shows another embodiment in which the sonde casing 20 comprises a spherical shape with the first and second symmetry planes C, D. The first and second symmetry planes C, D are perpendicular to each other. Also in this embodiment, the sonde casing 20 comprises third symmetry plane (not shown) extending perpendicularly to the first and second symmetry planes B, C.

It should be noted, that the sonde casing 20 may have shape comprising only one or two symmetry planes.

The self-sustaining aerological sonde 10 has a centre of gravity defined by the sonde casing and the measurement unit and the components of the measurement unit. In some embodiments, the centre of gravity is arranged on at least one of the symmetry planes B, C of the sonde casing. In other preferable embodiments, the centre of gravity is arranged on at least two of the symmetry planes B, C and in their intersection. In more preferable embodiments, the centre of gravity is arranged to intersection of three symmetry planes B, C of the sonde casing 20.

In the present application, the object is to provide the terminal velocity of the aerological sonde as small as possible so that the aerological sonde may float or drift along a cyclonic storm or in other meteorological conditions or turbulent flows in atmosphere as long as possible and the descent of the aerological sonde is as slow as possible. The smaller the terminal velocity is, the longer the aerological sonde can float around. In a cyclonic storm, there is usually updrafts and upward vertical flows greater than the terminal velocity of the aerological sonde may occur often if the terminal velocity of the aerological sonde is low. In these situations, the aerological sonde will actually ascend rather than descend, at least momentarily.

The terminal velocity of a shape is calculated with equation:

$$v_t = \sqrt{\frac{2mg}{\rho A C_D}},$$

where
m=mass of the object,
g=gravity (9.81 m/s$^2$),
ρ=density of the fluid (air 1,225),
A=projected or cross-sectional area of the object, and
$C_D$=drag coefficient of the object.

With Reynolds number given, there are basically two elements affecting the terminal velocity of the aerological sonde which may be controlled: mass or weight of the aerological sonde and the cross-sectional area or size and shape of the aerological sonde. By selecting a shape with a high drag coefficient the terminal velocity of the aerological sonde may be decreased. Increasing the size of the aerological sonde reduces the terminal velocity, but at the same time weight of the aerological sonde or the sonde casing 20 is increased.

In the present invention, the self-sustaining aerological sonde 10 has the terminal velocity equal to or less than 7 m/s, or preferably equal to or less than 5 m/s, or more preferably equal to or less than 4 m/s in standard atmospheric conditions. As disclosed above, the terminal velocity of the self-sustaining sonde is determined by the outer casing surface of the sonde casing, or the shape of the aerological sonde, and the weight of the self-sustaining aerological sonde. When the cyclonic storm comprises a vertical wind component or storm which is equal or greater than the terminal velocity of the self-sustaining aerological sonde, the self-sustaining aerological sonde maintains its altitude or raises upwards. In cyclonic storms, there are at times vertical wind components on the order of 3 m/s or greater. Also, in tornados such vertical wind components occur. Therefore, the self-sustaining aerological sonde may float or migrate in a cyclonic storm or tornado and along with the storm for prolonged time periods and considerable distances. When the self-sustaining aerological sonde has a terminal velocity of 7 m/s, or less, or 5 m/s or less, or 4 m/s or less, the self-sustaining aerological sonde may float in the cyclonic storm or a tornado for a prolonged time. However, when the terminal velocity of the aerological sonde is 7 m/s or less, or less or 5 m/s or less, or 4 m/s or less, it is likely that the cyclonic storm or the tornado comprises vertical wind components or streams enabling the self-sustaining aerological sonde float along the cyclonic storm or the tornado for prolonged time with very small or non-existing descent, as cyclonic storms or tornadoes at times have updrafts or vertically upwards flows equal to or greater than 3 m/s.

It is especially advantageous, when the terminal velocity of the aerological sonde is equal to 5 m/s or less as in cyclonic storms or atmospheric winds the updrafts or vertically upwards flows of 5 m/s or less are more common than considerably higher flow velocities.

In order to achieve the above mentioned terminal velocity, total weight of the self-sustaining aerological sonde 10 needs to be restricted in relating to the projected area. Increasing the size of the aerological sonde 10 would decrease the terminal velocity, but at the same time the weight of the aerological sonde would be increased due to the enlarged sonde casing 20. Therefore, the in order to achieve the above disclosed terminal velocity, the total weight of the aerological sonde 10 is equal to or less than 8 g, or preferably equal to or less than 6 g, or more preferably equal to or less than 5 g. When the total weight of the aerological sonde 10 is substantially 6 g or less, the size of the aerological sonde 10 and the sonde casing 20 may be kept rather small and the above disclosed terminal velocity may be still achieved.

The present invention is not limited to any particular weight of the aerological sonde 10, but the weight is provided such that the desired terminal velocity is achieved, as disclosed above.

Substantially means that the total weight of the aerological sonde may very within +/−5% of the mentioned weight, for example 6 g.

In order to achieve the total weight of 8 g or less, or 6 g or less, or 5 g or less, for the aerological sonde, the weight of the sonde casing 20 is 2.5 g or less. Preferably, the weight of the sonde casing 20 is substantially 2 g or less. The sonde casing 20 and the weight thereof consists of the casing walls and thus of the weight of the casing walls forming the outer surface of the sonde casing 20.

The present invention is not limited to any particular weight of the sonde casing 20, but the weight of the sonde casing is provided such that the desired terminal velocity is achieved, as disclosed above.

The sonde casing needs to have necessary mechanical strength and rigidity such that the measurement unit 12 and the components thereof are protected from damage and deterioration during the measurement time when the self-sustaining sonde 10 floats along the cyclonic storm, while slowly descending in many cases. Thus, the wall thickness of the sonde casing 20 needs to be thick enough to achieve the mechanical protection for the measurement unit 12 and thick enough for maintaining the shape of the sonde casing 20 under the forces of the cyclonic storm.

In some embodiments, the sonde casing 20 is made of material having material density equal to or less than 0.2 g/cm$^3$.

In preferable embodiments, the sonde casing 20 is made of material having material density equal to or less than 0.15 g/cm$^3$.

In more preferable embodiments, the sonde casing 20 is made of material having material density equal to or less than 0.1 g/cm$^3$.

One preferable material or type of material for the sonde casing is aerogel material. Aerogel is a synthetic porous ultralight material derived from a gel, in which the liquid component for the gel has been replaced with a gas. Aerogels have a solid structure with extremely low density and extremely low thermal conductivity. Aerogels are good thermal insulators and provide good thermal insulation. Aerogels by themselves are hydrophilic, but may be provided as hydrophobic, via a chemical treatment. Thus, a hydrophobic layer may be provided on the outer surface and/or inner surface of the aerogel or the sonde casing 20 made of aerogel material. Aerogel materials have density 0.2 g/cm$^3$ or less. Examples of aerogel materials are form example silica aerogels, carbon aerogels and metal oxide aerogels.

Another preferable material or type of material for the sonde casing is foam material having density according to above mentioned.

One preferable foam material is polystyrene foam material, and especially extruded polystyrene. Extruded polystyrene has a compact cell structure which provides high strength and good thermal insulation and moisture barrier. Extruded polystyrene has a very material density of about less than 0.05 g/cm$^3$ which makes is well suitable material for the self-sustaining aerological sonde 10. One preferable extruded polystyrene is marketed under the name Finnfoam®.

Figure 3:
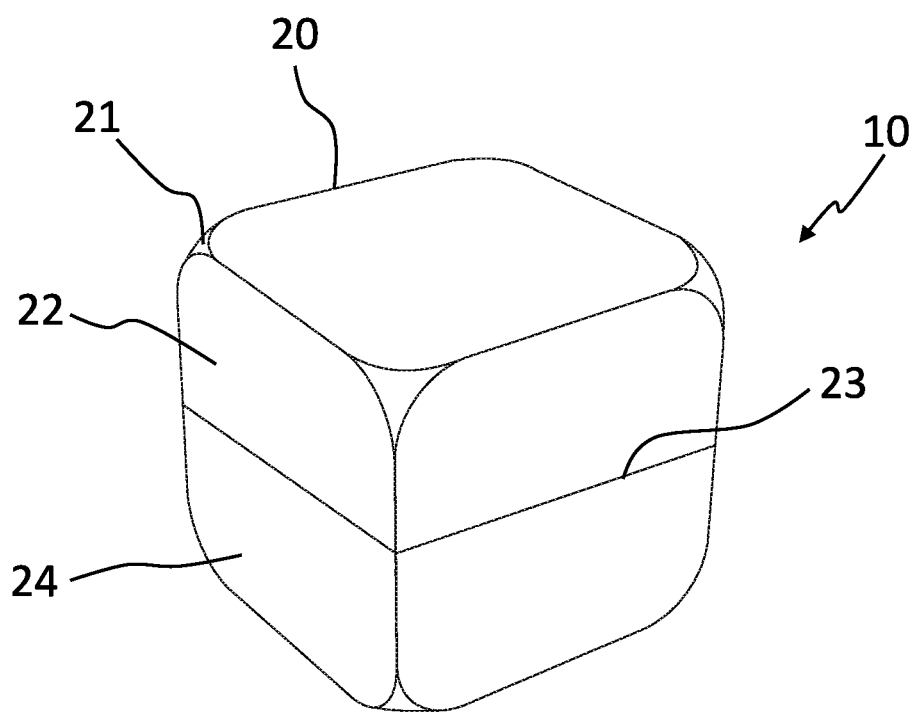
FIGS. 3, 4, 5, 6, 7, 8, 9, 10 and 11 show different embodiments of a cubical aerological sonde according to the present invention.

FIG. 3 shows one embodiment of an aerological sonde 10 according to the present invention. The aerological sonde 10 comprises a sonde casing 20 forming the outer surface of the aerological sonde. Thus, the sonde casing 20 comprises the outer surface and the outer surface forms and provides the shape or outer shape of the aerological sonde 10.

In the embodiment of FIG. 3, the aerological sonde 10 and the outer surface of the sonde casing 20 provides a cubic shape. Accordingly, the aerological sonde 10 of FIG. 3 has cubic outer shape. Further, the corners 21 of the cubic shape are rounded such that the aerological sonde 10 has rounded cubic shape.

The sonde casing 20 comprises casing walls which defines a hollow sonde space inside the sonde casing. A measurement unit and measurement components are provided and installed inside the sonde casing 20 and into the sonde space.

The sonde casing 20 comprises two halves, a first half 22 and a second half 24, which are attached to each other along a connection line 23, as shown in FIG. 3. The sonde space inside the sonde casing 20 is defined by the two halves 22, 24. This makes manufacturing of the sonde casing 20 simpler and also facilitates installing the measurement unit and measurement components inside the sonde casing 20. The halves 22, 24 are attached or secured to each other along the connection line 23 for sealing the sonde space inside the sonde casing.

The aerological sonde 10 of FIG. 3 has a drag surface which is formed solely by the outer surface of the sonde casing 20.

Figure 4:
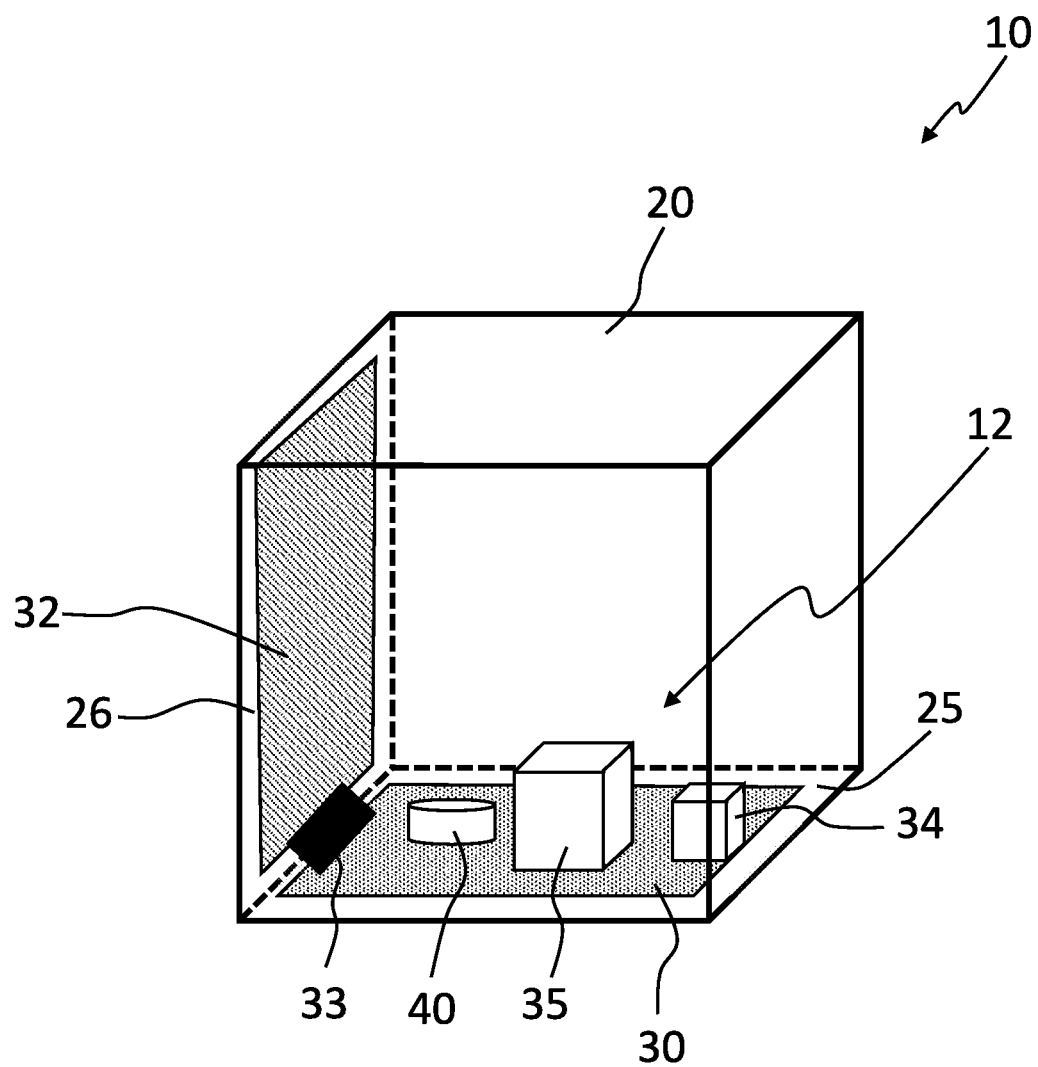

FIG. 4 shows schematically a one embodiment of the aerological sonde 10 having the sonde casing 20 and a measurement unit 12 arranged inside the sonde casing 20. The measurement unit 12 comprises a circuit board 30 or a printed circuit board 30 and measurement components provided to the printed circuit board 30 and in connection thereof.

The circuit board 30 may be one of the biggest components in the measurement unit 12. Thus, the circuit board has considerable effect on the weight of the measurement unit 12 and the aerological sonde 10.

A light-weight circuit board is preferable for the measurement unit 12.

In one embodiment, the circuit board 30 is a flexible circuit board 30.

The flexible circuit board 30 may be for example a flexible Polyimide circuit board.

The thickness of the flexible circuit board may be between 30 to 80 μm, for example 50 μm. Flexible circuit board 30 is very soft material and needs to be mechanically stabilized with a support.

In the embodiment of FIG. 4, the circuit board 30 is attached to the sonde casing 20, and especially to inner surface of the sonde casing 20 or casing walls. In the embodiment, of FIG. 4 the flexible circuit board is supported to the bottom wall 25, or inner surface thereof, of the sonde casing 20.

Securing or supporting the circuit board directly to the sonde casing 20 or a wall thereof may be utilized when sonde casing comprises at least one planar surface. Thus, the sonde casing 20 has a shape comprising at least one planar surface or wall and the circuit board 30 is attached to at least one planar surface or wall of the sonde casing 20. It should be noted, that the circuit board 30 may also be provided on two more separate walls or surfaces of the sonde casing 20.

Figure 5:
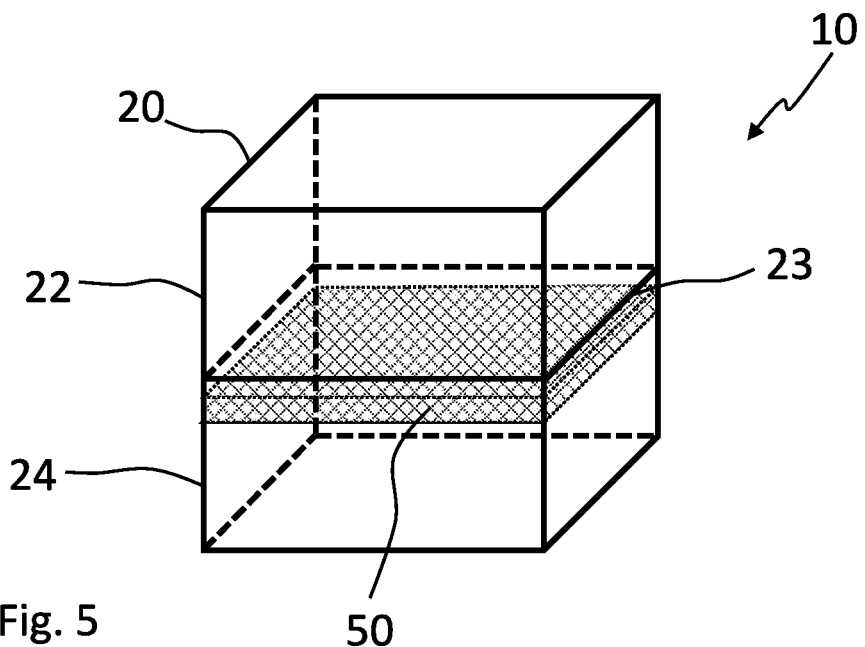
Figure 6:
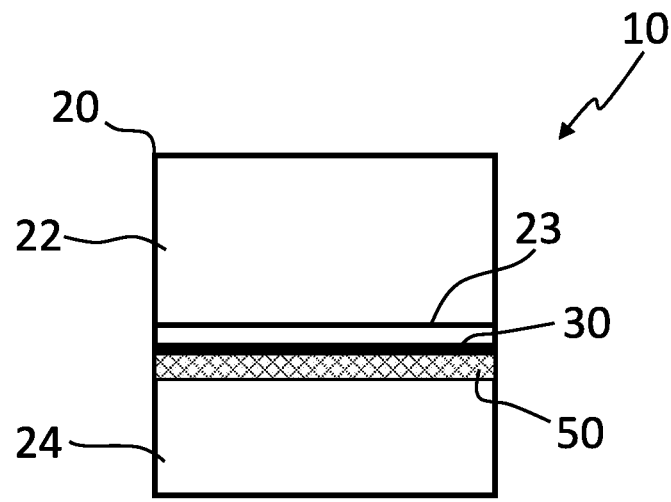
Figure 7:
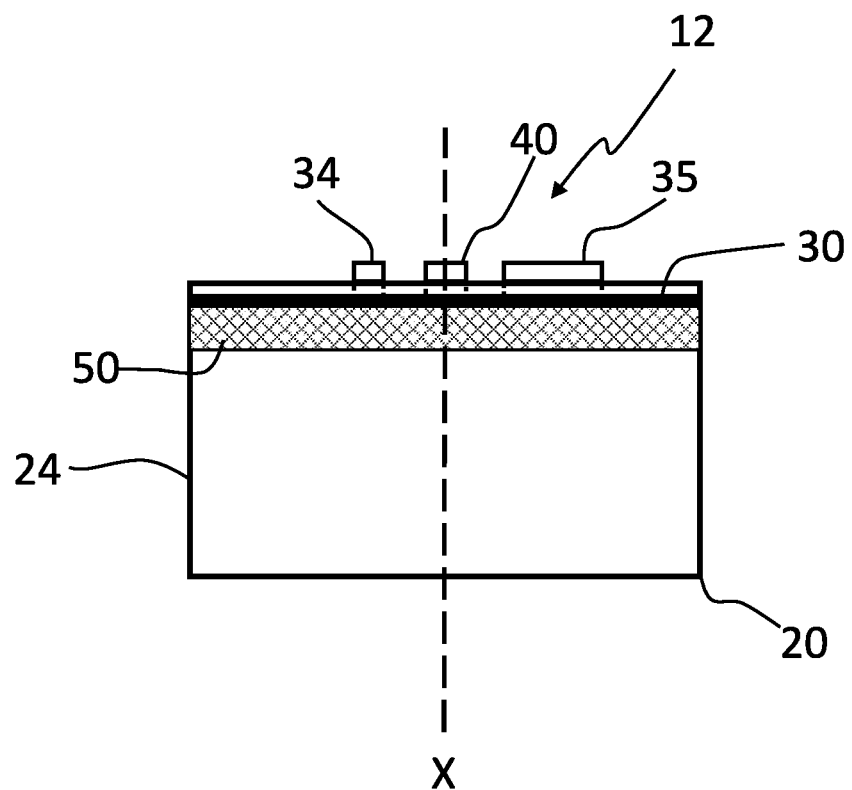

FIGS. 5, 6 and 7 show a different embodiment in which the self-sustaining aerological sonde is provided with a support structure 50. The support structure 50 is supported or secured to the sonde casing 20. As shown in FIGS. 5, 6 and 7, the support structure 50 is secured to the side walls of the sonde casing 20.

Further, the support structure 50 is secured to the second half 24 of the sonde casing. Thus, the connection line 23 between the first and second halves 22, 24 remains free. This makes manufacturing and assembling the aerological sonde 10 simple and effective.

The circuit board 30 or the flexible circuit board 30 is further attached or supported to the support structure 50, as shown in FIGS. 6 and 7. Thus, the support structure 50 provides a support surface and mechanical support for the circuit board 30.

The support structure 50 is especially good for flexible circuit board 30. The flexible circuit board 30 is supported and secured to the support structure 50. Thus, the flexible circuit board 30 is mechanically supported and provided with necessary rigidity.

The support structure 50 increases the weight of the aerological sonde 10. However, the support structure 50 also enables arranging the measurement unit, the circuit board and the measurement components closer to the centre point of the sonde casing 20. Thus, the centre of gravity of the aerological sonde 10 may be provided close to the geometrical centre point of the sonde casing 20. This enhances balancing the aerological sonde 10 for accurate movement measurements.

In some embodiments, the support structure 50 is made of same material as the sonde casing 20.

In some embodiment, the support structure 50 is made of aerogel material, paper-based material or foam material, such as extruded polystyrene. Further, in some embodiments, the support structure 50 is made of material having honeycomb or porous structure.

The support structure is preferably made of light-weight material for keeping the total weight of the aerological sonde 10 low.

In some embodiments, the support structure 50 is made of material having material density equal to or less than 0.2 g/cm$^3$, preferably equal to or less than 0.15 g/cm$^3$.

In more preferable embodiments, the support structure 50 is made of material having material density equal to or less than 0.1 g/cm$^3$.

Figure 12:
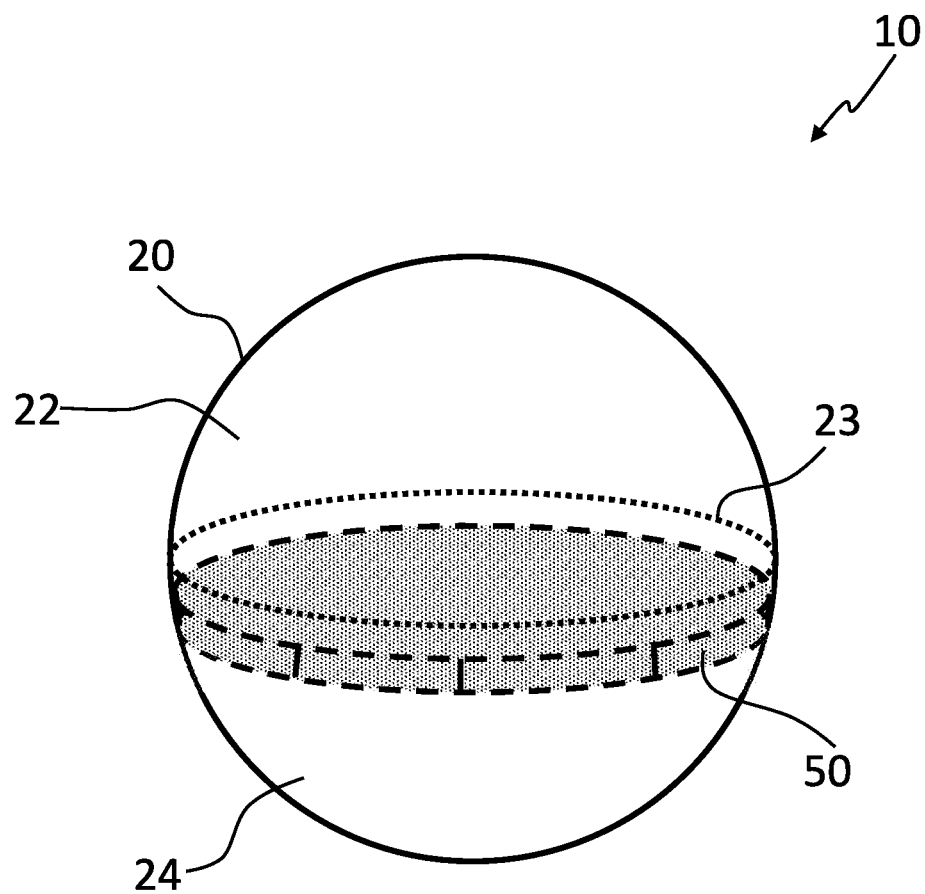
FIGS. 12, 13, 14, 15 and 16 show different embodiments of a spherical aerological sonde according to the present invention.
Figure 13:
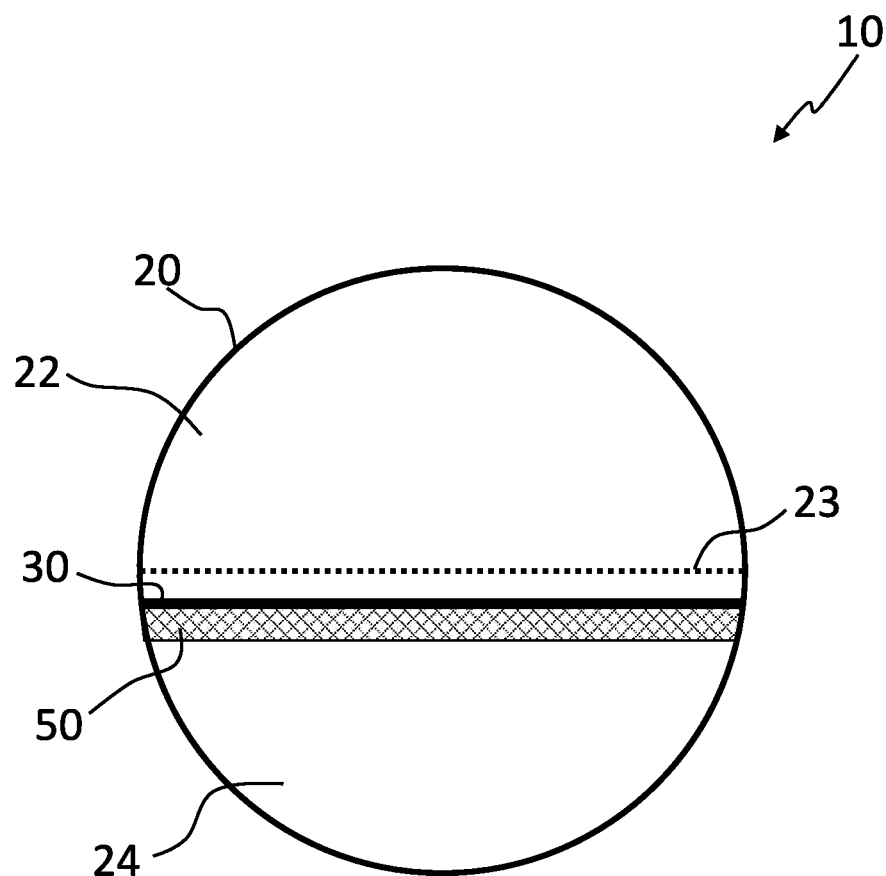
Figure 14:
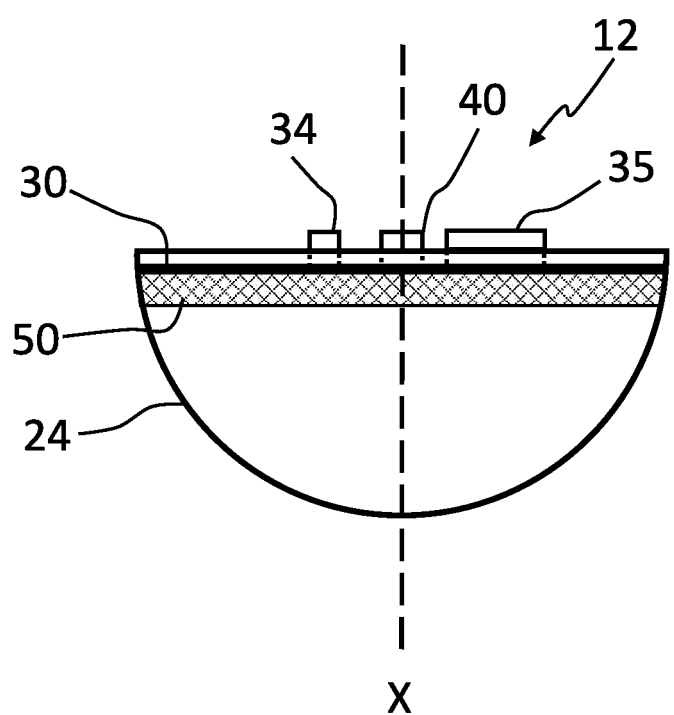

FIGS. 12, 13 and 14 show similar embodiments as described above, but the sonde casing 20 is spherical sonde casing 20. The support structure 50 is supported or secured to the sonde casing 20. As shown in FIGS. 12, 13 and 14, the support structure 50 is secured to the inner surface of the spherical sonde casing 20.

Further, the support structure 50 is secured to the second half 24 of the spherical sonde casing 20. Thus, the connection line 23 between the first and second halves 22, 24 remains free. This makes manufacturing and assembling the aerological sonde 10 simple and effective.

The circuit board 30 or the flexible circuit board 30 is further attached or supported to the support structure 50, as shown in FIGS. 13 and 14. Thus, the support structure 50 provides support surface and mechanical support for the circuit board 30.

The support structure 50 is particularly good for a flexible circuit board 30. The flexible circuit board 30 is supported and secured to the support structure 50. Thus, the flexible circuit board 30 is mechanically supported and provided with necessary rigidity.

The centre of gravity of the aerological sonde 10 may be provided close to the geometrical centre point of the spherical sonde casing 20 by utilizing the support structure 50 and placing the circuit board 30 on the support structure 50.

In some embodiments, the sonde casing 20 may also comprise reinforcement members.

Figure 8:
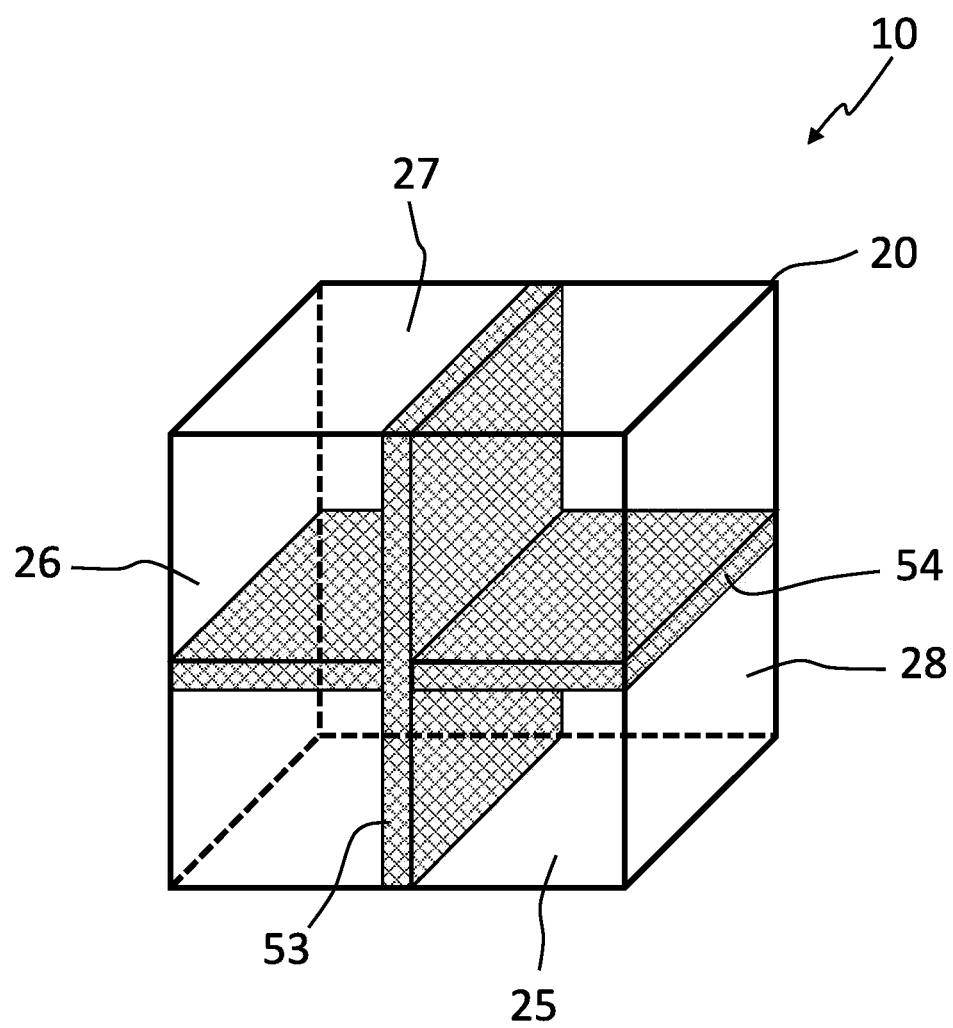

One embodiment of the structural reinforcement members 53, 54 is shown in FIG. 8. In FIG. 8, the sonde casing 20 comprises a first reinforcement member 54 extends between the first side wall 26 and the second wall 28 of the sonde casing 20 and between the third side wall 29 and the fourth side wall 29', and in horizontal direction in FIG. 8. Further, the second reinforcement member 53 extends between the top wall 27 and the bottom wall 25 of the sonde casing 20 and between the third side wall 29 and the fourth side wall 29' and in vertical direction in FIG. 8. The first and second reinforcement members or plates 54, 53 extend perpendicularly to each other.

There could also be a third reinforcement member (not shown) extending between the first side wall 26 and the second wall 28 of the sonde casing 20 and between the top wall 27 and the bottom wall 25 of the sonde casing 20 and in vertical direction in FIG. 8. The third symmetry plane extends perpendicularly to the first and second reinforcement members 54, 53.

The reinforcement members or plates 54, 53 may be arranged to locations of the symmetry planes, as in FIG. 11. In FIG. 8, the reinforcement members 54, 53 are provided as reinforcement plates.

Figure 9:
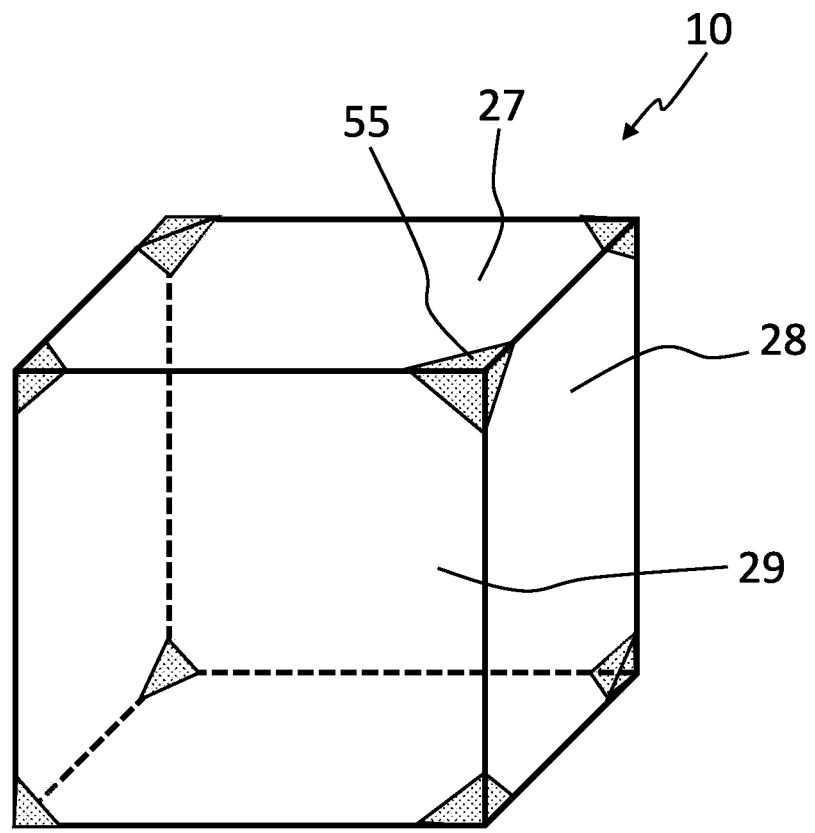

FIG. 9, shows another embodiment in which reinforcement members 55 are provided to corners of the cubical sonde casing 20. The reinforcements members 55 are provided as triangles provided to the corners and extending on the adjacent casing walls 27, 28, 29 from the corners. This provides mechanical strength to the sonde casing 20.

Figure 10:
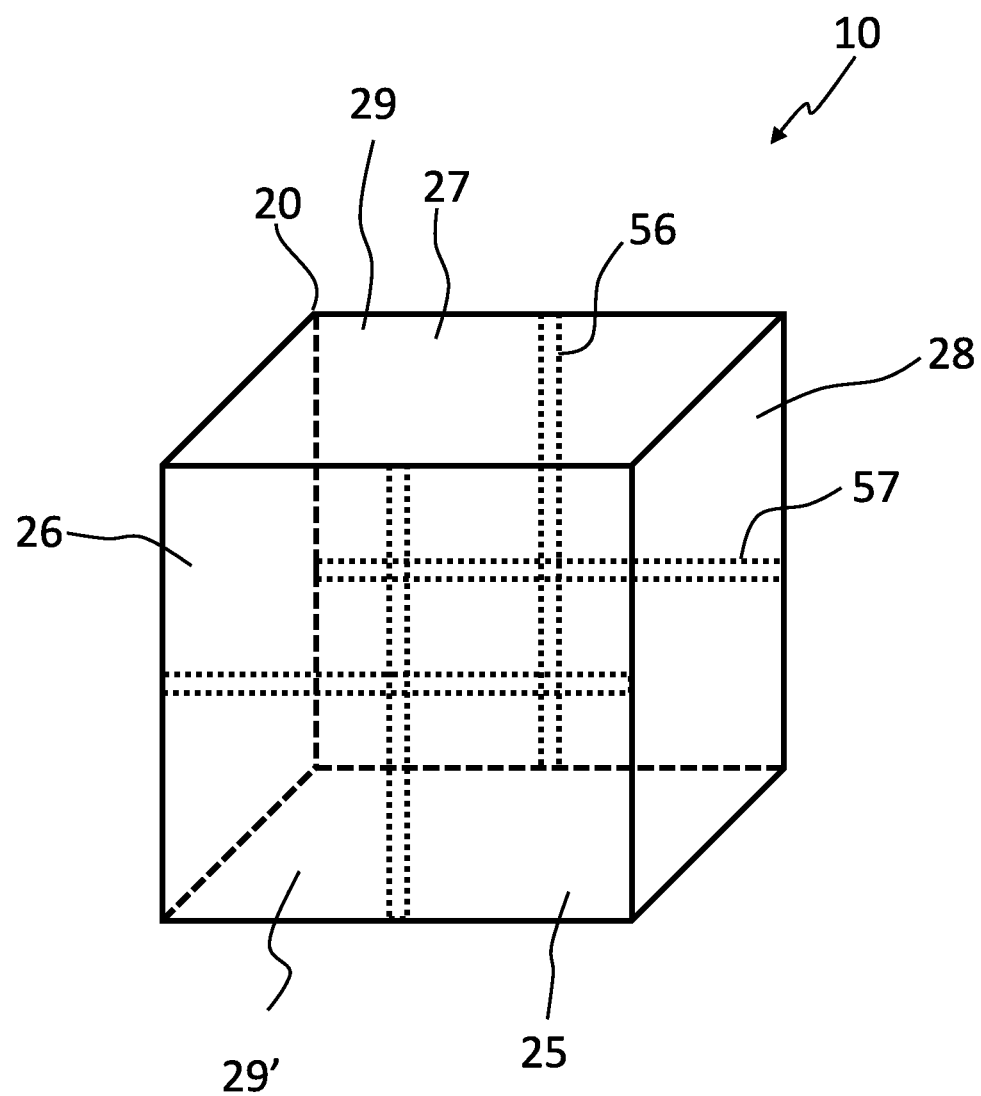

FIG. 10 shows a further embodiment, in which reinforcement members 56, 57 are provided to the inner surface of the casing walls 29, 29'.

The reinforcement members 56, 57 provided to casing walls 29, 29' extend preferably between casing walls 26, 27 adjacent to the casing wall 29, 29' with the reinforcement members 56, 57.

Figure 15:
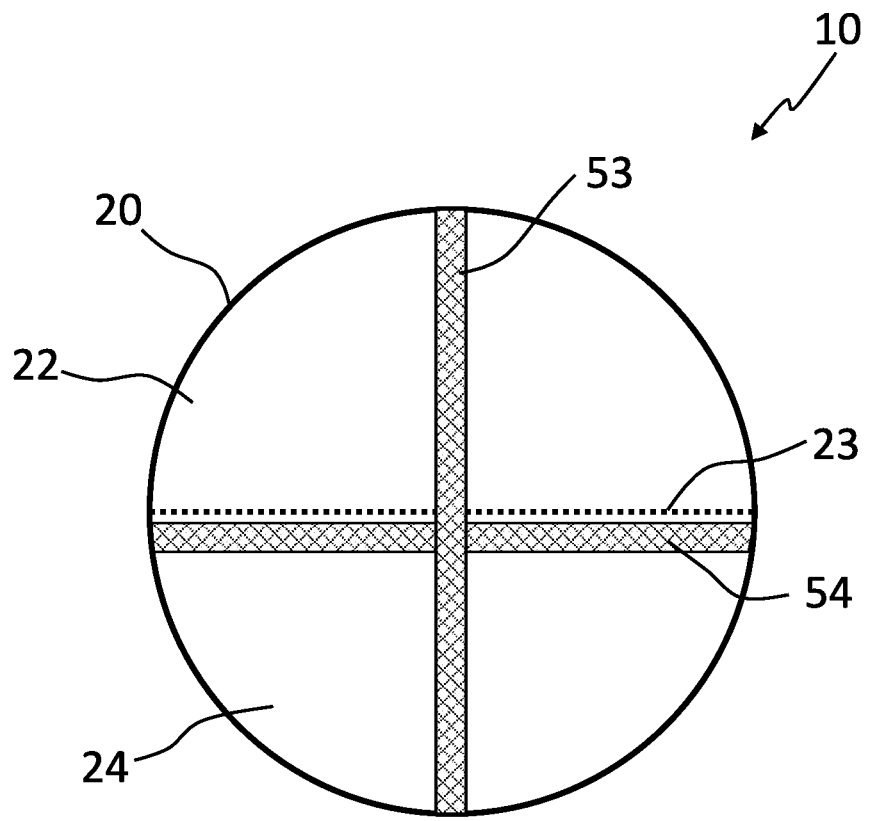

FIG. 15 shows an alternative embodiment in which the sonde casing 20 comprises spherical shape. This embodiment corresponds the embodiment of FIG. 8. The sonde casing 20 comprises the spherical shape with first and second reinforcement members 54, 53. The first and second reinforcement members 54, 53 are perpendicular to each other and extend through the inner space of the sonde casing 20. Also in this embodiment, the sonde casing 20 may comprise third reinforcement members (not shown) extending perpendicularly to the first and reinforcement members 54, 53.

The reinforcement members or plates 54, 53 may be arranged to locations of the symmetry planes, as in FIG. 16. In FIG. 15 the reinforcement members 54, 53 are provided as reinforcement plates.

Further, it should be noted that the reinforcement members or plates 54, 53 may also form the support structure 50 for the circuit board 30 or flexible circuit board 30.

The reinforcement members 54, 53, 55, 56, 57 may be made of same material as the sonde casing 20 or from the same material as the support structure 50. Alternatively, the reinforcement members 54, 53, 55, 56, 57 may be made of different material than the sonde casing 20 and the support structure 50.

Figure 26:
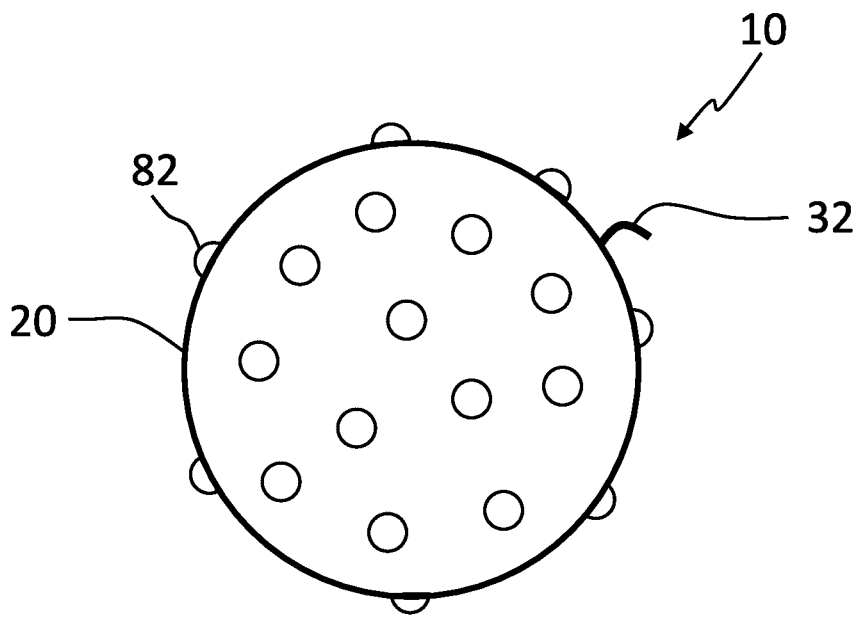
FIGS. 26 and 27 show schematically embodiments of a sonde casing of the aerological sonde according to the present invention.

FIG. 26 further shows one embodiment of the sonde casing 20. As shown in FIG. 26, the outer surface of the sonde casing 20 or the casing walls are provided with protrusions 82 extending outwards from the outer surface of the sonde casing 20. The protrusions increase the drag surface and also cause turbulent streams around the self-sustaining sonde 10 such that the drag force is increased and the terminal velocity of the aerological sonde 10 decreased.

The protrusions 82 may be integral part of the sonde casing 20. Alternatively, the protrusions are attached to the outer surface of the sonde casing 20.

The protrusions 82 may be made of same material as the sonde casing 20 or from the same material as the support structure 50. Alternatively, the protrusions 82 may be made of different material than the sonde casing 20 and the support structure 50. The protrusions 82 may be attached to the sonde casing 20 or the outer surface thereof or formed from the material of the sonde casing 20.a In some embodiments, the meteorological measurement element 60 or at least part, for example a meteorological sensor part, of it is provided outside the sonde casing 20. The meteorological measurement element 60 or the meteorological sensor part thereof may extend from the inside of the sonde casing 20 to the outside of the sonde casing 20.

Alternatively, the meteorological measurement element 60 or the meteorological sensor part thereof may be arranged outside the sonde casing 20.

The meteorological sensor part may be a sensor tip or sensor strip.

In some embodiments, the meteorological measurement element 60 or the meteorological sensor part extends outwards form the outer surface of the sonde casing 20. In this embodiment, the meteorological measurement element 60 or the meteorological sensor part thereof forms at least one of the protrusions 82.

In another embodiment, the meteorological measurement element 60 or the meteorological sensor part thereof is arranged against the outer surface of the sonde casing. In this embodiment, the meteorological measurement element 60 or the meteorological sensor part thereof forms part of the outer surface of the sonde casing 20.

In further alternative embodiment, an antenna or part of the antenna 32 may extend outwards form the outer surface of the sonde casing 20, as shown in FIG. 26. The antenna or part of the antenna may be FM antenna, or any other antenna provided to the measurement unit 12.

Accordingly in the above embodiments, the drag surface of the aerological sonde is formed by the outer casing surface and the meteorological measurement element and/or the meteorological sensor part and/or the antenna extending form the outer casing surface.

Figure 27:
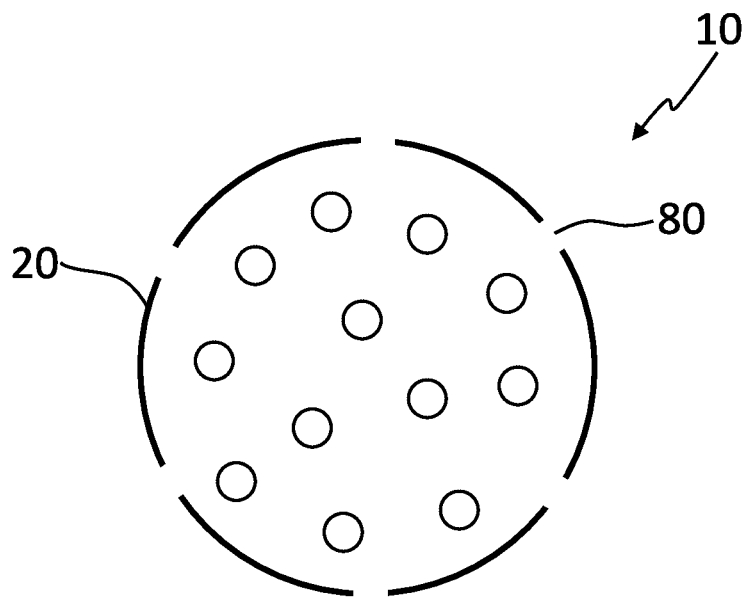

FIG. 27 shows an embodiment, in which the sonde casing 20 comprises openings 80 extending through the casing walls on the sonde casing 20. There may be one or more openings, or two or more openings 80 in the sonde casing 20. Thus, the openings 82 extend from the outer surface of the sonde casing 20 to the inner surface of the sonde casing 20.

The openings 80 enable air flow inside the sonde casing 20 and thus the drag force subjected to the aerological sonde 10 is increased. The openings 80 and the sonde casing 20 together for parachute-like structure as the air flows may enter inside the sonde casing 20.

The size and shape of the openings 80 may vary depending on different embodiments.

In this embodiment, the measurement unit 12 is preferably encapsulated with protective material for protecting the measurement unit 12 and the components thereof from the air flows.

The sonde casing 20 may in some embodiments comprise both the openings 80 and the protrusions 82.

Figure 21:
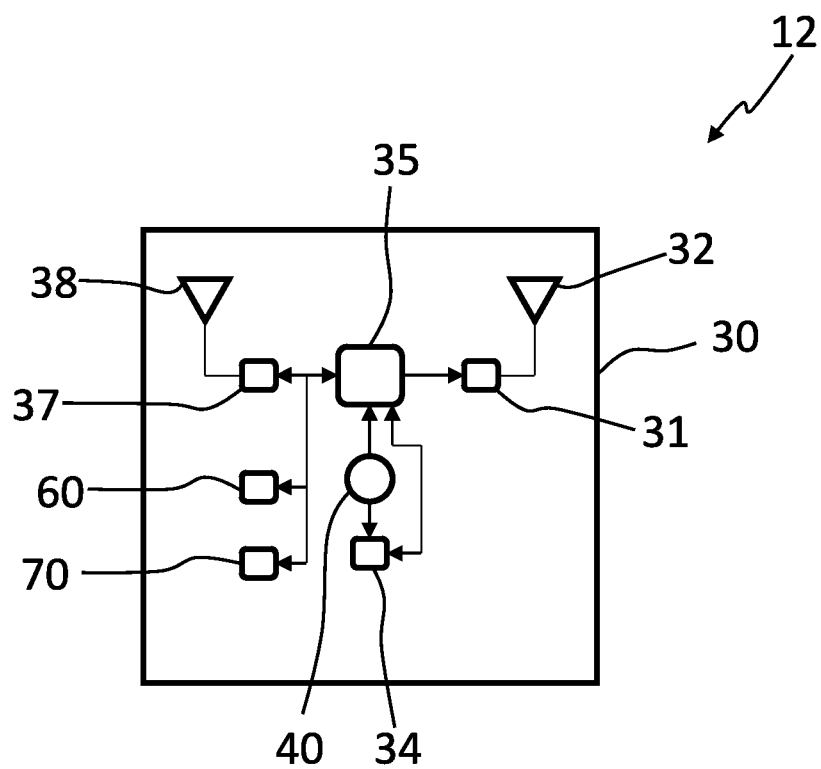
FIG. 21 shows schematically one embodiment of a measurement unit of the aerological sonde according to the present invention.

FIG. 21 shows one embodiment of the measurement unit 12 of the self-sustaining aerological sonde. 10.

The measurement unit comprises a power source 40 which provides electrical power to the measurement unit 12 and components thereof.

In one embodiment, the measurement unit 12 comprises a power source or a battery or an accumulator having weight equal to or less than 2 g. Battery is the heaviest component in the measurement unit 12, and thus a light-weight battery having weight 2 g or less is essential for achieving the terminal velocity of 3 m/s or under.

In some embodiments, the battery 40 is a Lithium-Polymer battery or a semi-solid Lithium metal battery or a foam battery with porous copper structure. The measurement unit 12 further comprises power management circuitry 34 connected to the battery 40 and a microcontroller 35. The power management circuitry 34 controls power usage of the measurement unit 12 and components thereof.

In one embodiment, the measurement unit 12 comprises one or more of the following a pressure sensor, a humidity sensor, and a temperature sensor 70.

In preferred embodiments, the measurement unit 12 comprises meteorological sensor 60 or meteorological measurement element 60 comprising at least two of the pressure sensor, the humidity sensor, and the temperature sensor in one component. This provides decreased weight for the meteorological sensor components 60.

Figure 22:
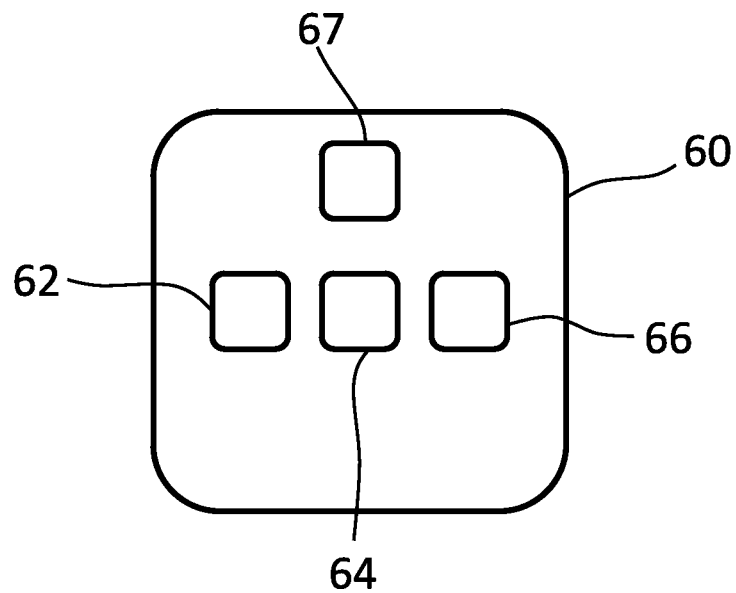
FIG. 22 shows schematically one embodiment of a meteorological measurement element of the aerological sonde according to the present invention.

FIG. 22 shows an embodiment in which the meteorological sensor 60 comprises at least two of the pressure sensors 62, the humidity sensor 64, and the temperature sensor 66 in one component.

The pressure sensor 2, humidity sensor 64 and the temperature sensor may be any known kind sensors.

In some embodiments, the measurement unit 12 or the meteorological measurement element 60 further comprises a magnetometer 67. The magnetometer is arranged to measure changes in magnetic field in the atmosphere, for example caused by thunders. The magnetometer 67 may be any known kind of magnetometer, preferably a very light-weight magnetometer.

In some embodiment, the measurement unit 12 may also comprise one or more gas sensors (not shown) for measuring one or more different gases in the atmosphere during migration. The gas sensor may be for example an ozone sensor or nitrogen oxide (NOX) sensor.

The measurement unit 12 further comprises a global navigation satellite system element comprising a global navigation satellite system receiver 37 and global navigation satellite system antenna 38.

The global navigation satellite system receiver 37 comprises a global positioning system (GPS) receiver. Alternatively, global navigation satellite system receiver 37 comprises a GPS, Galileo, Beidou and/or Glonass receiver.

The global navigation satellite system antenna 38 is provided as linearly polarized antenna.

The global navigation satellite system antenna 38 is provided to the circuit board 30 or to the flexible circuit board 30 as circuit board antenna.

Alternatively, the global navigation satellite system antenna 38 is provided to the circuit board 30 or to the flexible circuit board 30 as a linearly polarized chip antenna. This may also be a circuit board antenna.

The circuit board antenna or chip antenna 38 may be linearly polarized antennas.

The circuit board antenna or chip antenna 38 is preferable due to their light-weight structure of these types of antennas.

The global navigation satellite system element 36, 38 is utilized for measuring location data of the aerological sonde 10.

The measurement unit 12 further comprises a telemetry element 31. The telemetry element 31 is arranged to transmit measurement results from the aerological sonde 10 to a remote location or system. Thus, in some embodiments the telemetry element 31 is arranged transmit measurement results of the turbulence sensor 70 and possible meteorological measurement element 60.

In one embodiment, the telemetry element 31 is a frequency modulation (FM) element 31 comprising FM link and FM transmitter. An FM antenna 32 is connected to the FM element 31.

The FM antenna 32 is provided to the circuit board 30 or to the flexible circuit board 30 as circuit board antenna.

The FM antenna 32 may be a folded dipole antenna provided to the circuit board 30.

Alternatively, the FM antenna 32 may be wire antenna.

In another embodiment, the telemetry element 31 is a Wifi element or the like communication element.

The circuit board antenna, folded dipole antenna or the wire antenna 32 are preferable due to their light-weight structure.

The measurement unit 12 of the aerological sonde 10 comprises a turbulence sensor 70 arranged to measure turbulence in the cyclonic storm.

Figure 25:
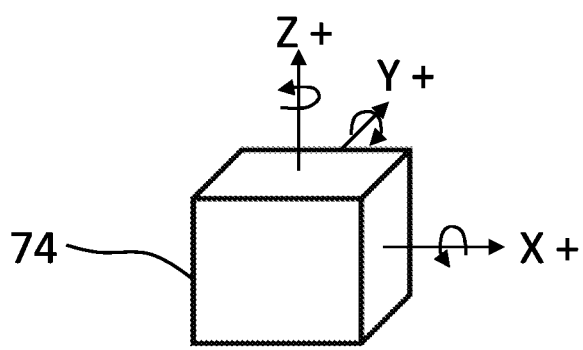

In one embodiment, the turbulence sensor 70 comprises a gyroscopic sensor 74 arranged to measure orientation of the self-sustaining aerological sonde, as shown in FIG. 25.

The gyroscopic sensor 74 is arranged to measure changes in orientation of the aerological sonde 10 or angular velocity of the aerological sonde 10 in relation to at least one rotation axis X, Y or Z of the aerological sonde 10. Thus, the gyroscopic 72 sensor may measure spinning or turning of the aerological sonde 10 in the cyclonic storm due to the turbulent streams or turbulent flows in the cyclonic storm.

In one embodiment, the gyroscopic sensor 74 is a multi-dimensional gyroscopic sensor. In this embodiment, the gyroscopic sensor 74 is constructed and arranged to measure orientation or angular velocity of the aerological sonde in relation to two or more rotation axes, or three rotation axes X, Y and Z. The multi-dimensional gyroscopic sensor 74 has a good effective weight as the one component is able to measure turbulence in the cyclonic storm and spinning of the aerological sonde 10 around two or more rotation axes X, Y and Z.

In another embodiment, the gyroscopic sensor is a 3-dimensional gyroscopic sensor 74, as shown in FIG. 25. In this embodiment, the gyroscopic sensor 74 is constructed and arranged to measure orientation or angular velocity of the aerological sonde 10 in relation to three rotation axes X, Y and Z. Preferably, the three rotation axes X, Y and Z extend perpendicularly to each other.

Alternatively, the gyroscopic sensor 74 comprises one or more one-dimensional gyroscopic sensors. In this embodiment, the turbulence sensor 70 comprises one or more separate one-dimensional gyroscopic sensors 74 each of which is constructed and arranged to measure orientation or angular velocity of the aerological sonde 10 in relation to one rotation axis.

The gyroscopic sensor 74 is a vibrating structure gyroscopic sensor.

The vibrating gyroscopic sensor 74 may be a microelectromechanical gyroscopic sensor, MEMS gyroscopic sensor.

In one embodiment, the turbulence sensor 70 comprises an accelerometer 72 arranged to measure change of rate of velocity of the self-sustaining aerological sonde 10. The accelerometer 72 measures changes in moving velocity of the aerological sonde 10.

In one embodiment, the accelerometer 72 is a multi-dimensional accelerometer. In this embodiment, the accelerometer 72 is constructed and arranged to measure acceleration of the aerological sonde in direction of two or more velocity axes X, Y and Z. Preferably, the two or more velocity axes X, Y and Z extend perpendicularly to each other.

Figure 24:
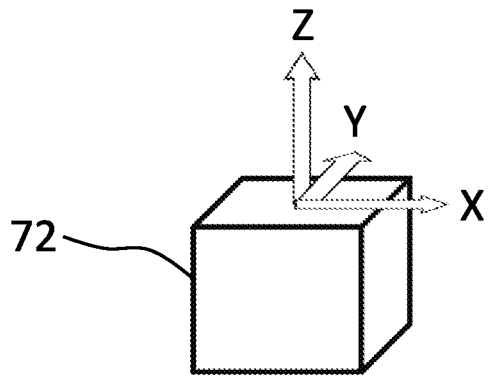

In another embodiment, the accelerometer 72 is a 3-dimensional accelerometer, as shown in FIG. 24. In this embodiment, the accelerometer 72 is constructed and arranged to measure changes in movement velocity of the aerological sonde 10 in relation to three velocity axes X, Y and Z. Preferably, the three velocity axes X, Y and Z extend perpendicularly to each other.

In a further embodiment, the accelerometer 72 comprises one or more one-dimensional accelerometers. In this embodiment, the accelerometer 72 comprises one or more separate one-dimensional accelerometers each of which is constructed and arranged to measure change of velocity of the aerological sonde in direction of one velocity axis X, Y or Z.

The accelerometer is a microelectromechanical accelerometer, MEMS accelerometer.

The accelerometer 72 provides acceleration measurement values which may further be used for calculating jerk and jounce. Jerk is the change of rate of acceleration and jounce is change of rate of jerk.

Figure 23:
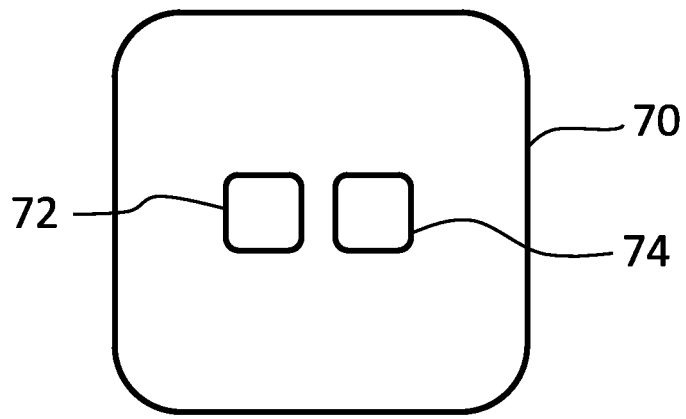
FIGS. 23, 24 and 25 show schematically one embodiment of a movement sensor element of the aerological sonde according to the present invention.

Preferably, the gyroscopic sensor 74 and the accelerometer 72 are provided as a single component 70, as shown in FIG. 23. This provides light weight and efficient utilization of space in the aerological sonde.

In another embodiment, the gyroscopic sensor 74 and the accelerometer 72 are provided as separate components.

In one embodiment, the turbulence sensor 70, or the accelerometer 72 and/or gyroscopic sensor 74 thereof, is secured to the sonde casing 10. The turbulence sensor 70, or the accelerometer 72 and/or gyroscopic sensor 74 thereof, may be provided to the circuit board 30 and the circuit board 30 is secured or attached to the to the sonde casing 20 or to the inner surface of the sonde casing 20 for securing the turbulence sensor 70 to the sonde casing 20.

The invention has been described above with reference to the examples shown in the figures. However, the invention is in no way restricted to the above examples but may vary within the scope of the claims.

The invention claimed is:

1. An aerological sonde for measuring meteorological conditions in an atmosphere, the aerological sonde comprising:
    a sonde casing including casing walls having an outer surface, the outer surface of the casing walls forming an outer casing surface, and a measurement unit arranged inside the sonde casing, the outer casing surface of the sonde casing is arranged to form a drag surface of the aerological sonde such that a self-sustaining aerological sonde is formed, the drag surface of the aerological sonde being determined by the outer surface of the casing walls forming the outer casing surface of the sonde casing, the measurement unit of the aerological sonde comprises a turbulence sensor arranged to measure movement of the self-sustaining aerological sonde for measuring turbulence in the atmosphere, and the measurement unit of the aerological sonde comprises a magnetometer arranged to measure changes in magnetic field in the atmosphere,
    the sonde casing comprises a first symmetry plane (B) and a second symmetry plane (C), the first symmetry plane (B) and the second symmetry plane (C) extending perpendicularly to each other, and
    the self-sustaining aerological sonde comprises a center of gravity and defines a weight, the center of gravity is arranged to at least one of the first symmetry plane (B) or the second symmetry plane (C), wherein:
        the turbulence sensor comprises a 3-dimensional gyroscopic sensor arranged to measure angular velocity of the self-sustaining aerological sonde in 3-dimensional space around three rotation axes and a 3-dimensional accelerometer arranged to measure changes in movement velocity of the self-sustaining aerological sonde in the 3-dimensional space in relation to three velocity axes,
    wherein the self-sustaining aerological sonde has a terminal velocity, the terminal velocity of the self-sustaining aerological sonde being determined by the outer casing surface of the sonde casing and the weight of the self-sustaining aerological sonde, the terminal velocity being equal to or less than 5 m/s, wherein a drag coefficient of the self-sustaining aerological sonde defined by a shape of the outer casing surface is equal to or greater than 0.4, with a Reynolds number of $10^4$.

2. The aerological sonde according to claim 1, wherein the outer casing surface of the sonde casing is arranged to form a sole drag surface of the aerological sonde such that the self-sustaining aerological sonde is formed.

3. The aerological sonde according to claim 1, wherein the gyroscopic sensor is:
a vibrating structure gyroscopic sensor; or
a microelectromechanical gyroscopic sensor.

4. The aerological sonde according to claim 1, wherein the accelerometer is a microelectromechanical accelerometer.

5. The aerological sonde according to claim 1, wherein the gyroscopic sensor and the accelerometer are provided as a single component.

6. The aerological sonde according to claim 1, wherein:
the turbulence sensor is secured to the sonde casing; or
the turbulence sensor is arranged to a measurement unit support, the measurement unit support being secured to the sonde casing.

7. The aerological sonde according to claim 1, wherein the measurement unit comprises a global navigation satellite system element arranged to provide location information of the self-sustaining aerological sonde.

8. The aerological sonde according to claim 1, wherein the measurement unit comprises one or more of the following:
a pressure sensor;
a humidity sensor;
a temperature sensor; and
a gas sensor.

9. The aerological sonde according to claim 1, wherein the sonde casing comprises a third symmetry plane, the first symmetry plane (B), the second symmetry plane (C) and the third symmetry plane extending perpendicularly to each other.

10. The aerological sonde according to claim 1, wherein the terminal velocity of the self-sustaining aerological sonde is equal to or less than 4 m/s.

11. A method for measuring meteorological conditions in an atmosphere with an aerological sonde, the aerological sonde comprising a sonde casing, the sonde casing including casing walls having an outer surface, the outer surface of the casing walls forming an outer casing surface, and a measurement unit arranged inside the sonde casing, in which method the aerological sonde is released into the atmosphere for measuring meteorological conditions of the atmosphere, the aerological sonde comprises the outer casing surface arranged to form a drag surface of the aerological sonde such that a self-sustaining aerological sonde is formed, the drag surface of the aerological sonde being determined by the outer surface of the casing walls forming the outer casing surface of the sonde casing, the sonde casing comprises a first symmetry plane (B) and a second symmetry plane (C), the first symmetry plane (B) and the second symmetry plane (C) extending perpendicularly to each other, and the self-sustaining aerological sonde comprises a center of gravity and defines a weight, the center of gravity is arranged to at least one of first symmetry plane (B) or the second symmetry plane (C), the self-sustaining aerological sonde has a terminal velocity, the terminal velocity of the self-sustaining aerological sonde being determined by the outer casing surface of the sonde casing and the weight of the self-sustaining aerological sonde, the terminal velocity being equal to or less than 5 m/s, a drag coefficient of the self-sustaining aerological sonde defined by a shape of the outer casing surface is equal to or greater than 0.4, with a Reynolds number of $10^4$, the method comprises:
migrating the aerological sonde in the atmosphere by utilizing the drag surface of the self-sustaining aerological sonde; and
measuring movement of the self-sustaining aerological sonde with a turbulence sensor provided to the aerological sonde during migration of the self-sustaining aerological sonde in the atmosphere for measuring turbulence of the atmosphere wherein:
the method comprises:
measuring angular velocity of the self-sustaining aerological sonde in the atmosphere around three rotation axes with a 3-dimensional gyroscopic sensor;
measuring changes in movement velocity of the self-sustaining aerological sonde in the atmosphere in relation to three velocity axes with a 3-dimensional accelerometer; and
measuring changes in magnetic field in the atmosphere with a magnetometer.

12. The method according to claim 11, wherein the aerological sonde comprises the outer casing surface arranged to form a sole drag surface of the aerological sonde such that a self-sustaining aerological sonde is formed, and wherein the method further comprises:
migrating the self-sustaining aerological sonde in the atmosphere by utilizing the sole drag surface of the self-sustaining aerological sonde; and
measuring turbulence of the atmosphere with the turbulence sensor provided to the self-sustaining aerological sonde during migration of the self-sustaining aerological sonde in the atmosphere.

13. The method according to claim 11, wherein the method further comprises measuring location of the self-sustaining aerological sonde with a global navigation satellite system during migration of the self-sustaining aerological sonde in the atmosphere.

14. The aerological sonde according to claim 1, wherein the weight of the self-sustaining aerological sonde is equal to or less than 8 g.

15. The aerological sonde according to claim 1, wherein the sonde casing defines a weight, and wherein the weight of the sonde casing is equal to or less than 2.5 g.

16. The aerological sonde according to claim 1, wherein the aerological sonde is free from an external drag member increasing drag force of the aerological sonde.

17. The aerological sonde according to claim 1, wherein the 3-dimensional gyroscopic sensor is a single sensor.

18. The aerological sonde according to claim 1, wherein the 3-dimensional accelerometer is a single accelerometer.

19. The aerological sonde according to claim 1, wherein the terminal velocity of the self-sustaining aerological sonde is greater than 1 m/s.

* * * * *